United States Patent
Durham et al.

(10) Patent No.: US 6,611,078 B1
(45) Date of Patent: Aug. 26, 2003

(54) FLUX DIODE MOTOR

(75) Inventors: Gary L. Durham, Wichita, KS (US); Harold S. Durham, Wichita, KS (US)

(73) Assignee: Tri-Seven Research, Inc., Wchita, KS (US)

( * ) Notice: Subject to any disclaimer, the term of this patent is extended or adjusted under 35 U.S.C. 154(b) by 0 days.

(21) Appl. No.: 09/619,618

(22) Filed: Jul. 19, 2000

(51) Int. Cl.[7] .......................... H02K 1/12; H02K 23/04
(52) U.S. Cl. ................... 310/254; 310/154.29
(58) Field of Search .................. 310/68 R, 181, 310/254, 179, 154.01, 154.02, 154.28, 154.29, 152

(56) References Cited

U.S. PATENT DOCUMENTS 4,899,074 A * 2/1990 West ..................... 310/154.27
4,980,593 A * 12/1990 Edmundson ........... 310/154.26

* cited by examiner

Primary Examiner—Nestor Ramirez
Assistant Examiner—Guillermo Perez
(74) Attorney, Agent, or Firm—Young & Basile, P.C.

(57) ABSTRACT

The invention pertains to electrical machines of the electromagnetic type employing a stator and a rotatable rotor such as electric motors and generators wherein magnetic forces imposed upon the rotor produce rotor rotation. The invention utilizes permanent magnets in either the stator or rotor assembly to control the magnetic flux flow in one direction and encourage the flux in the opposite direction in certain areas of the stator and rotor assembly. Rotating flux conducting metal shunts are disposed adjacent permanent magnets creating magnetic flux to control the flux flow and pattern to most effectively use the flux forces on the rotor resulting in very high efficiencies in motor or generator operation.

4 Claims, 17 Drawing Sheets

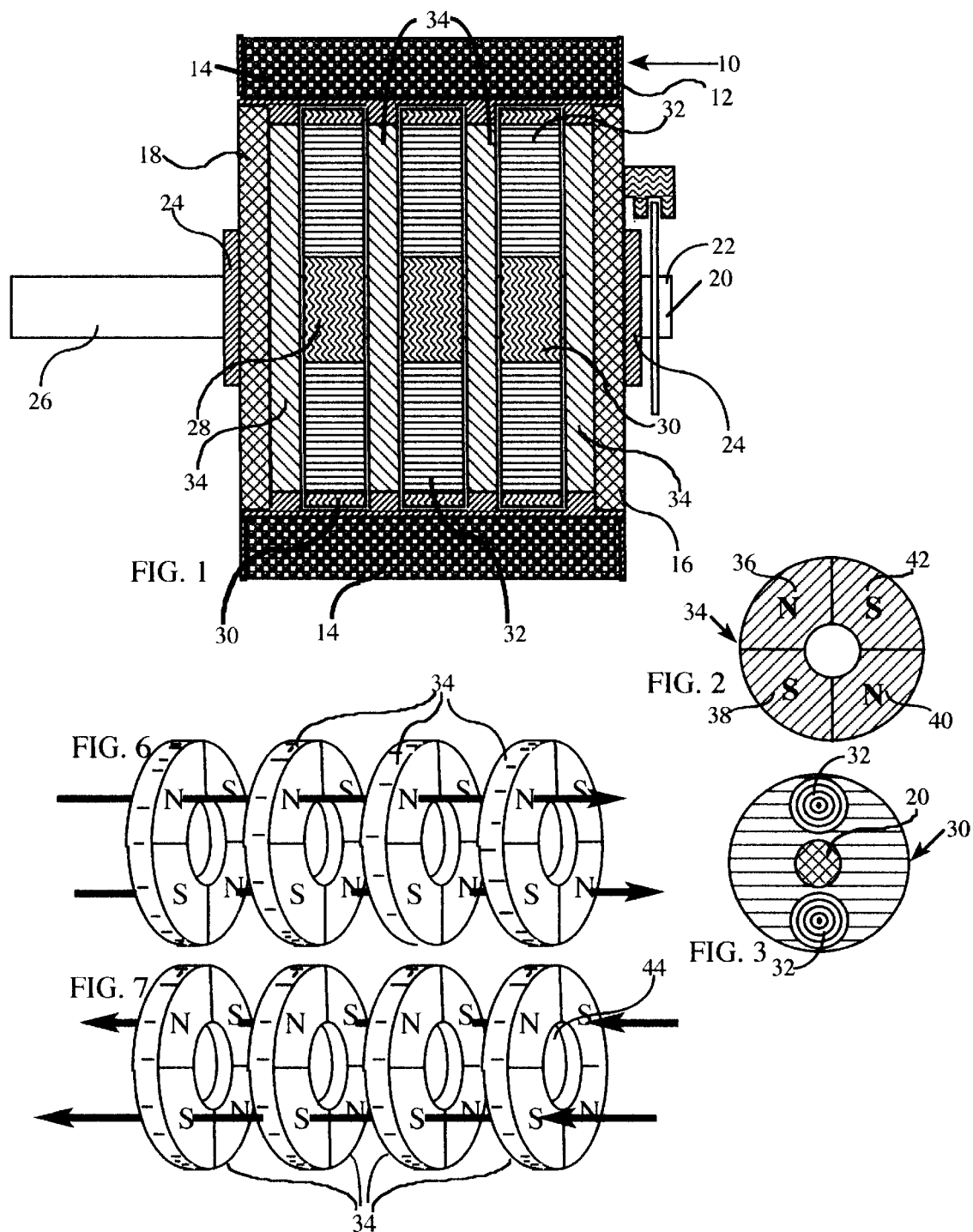

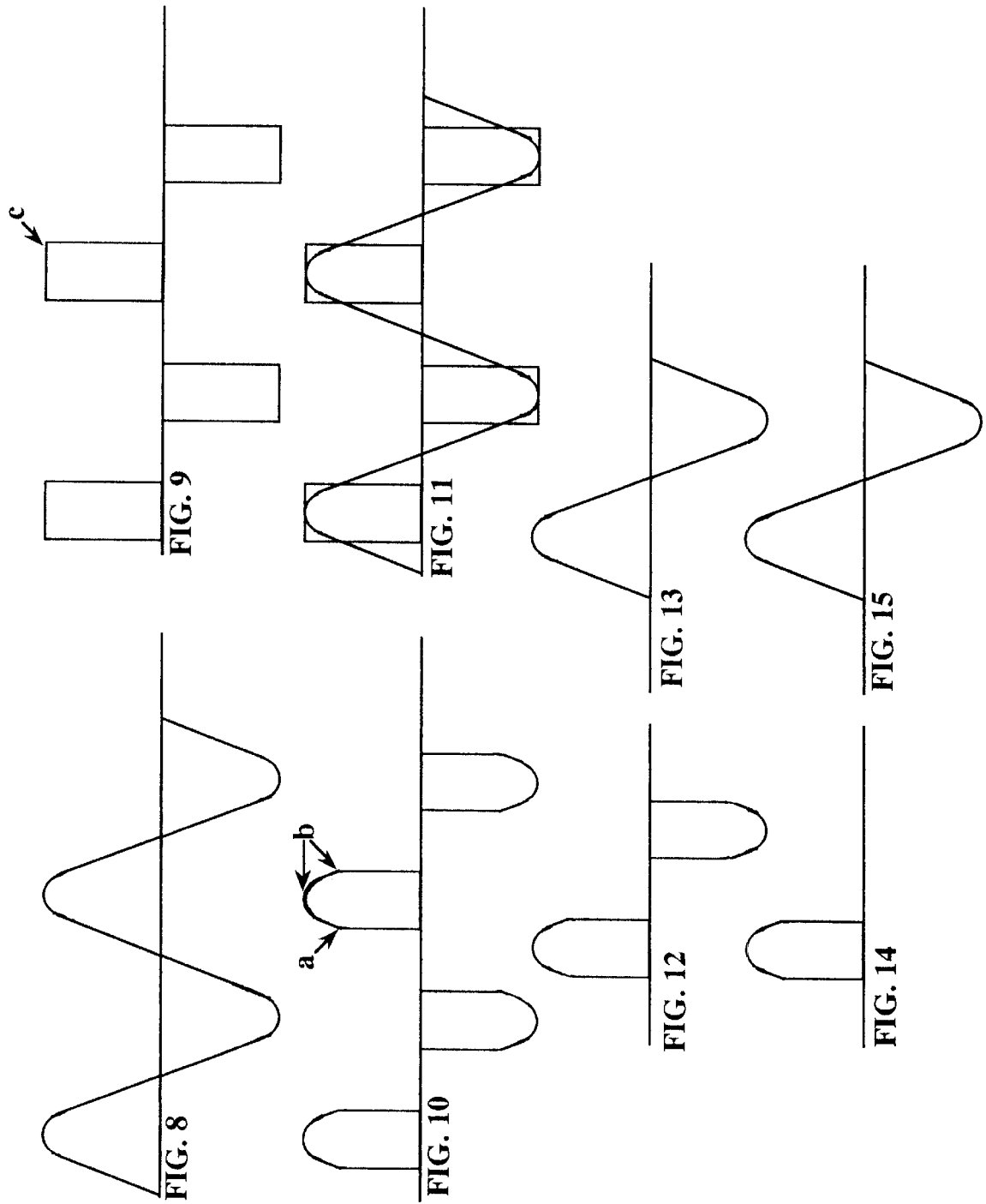

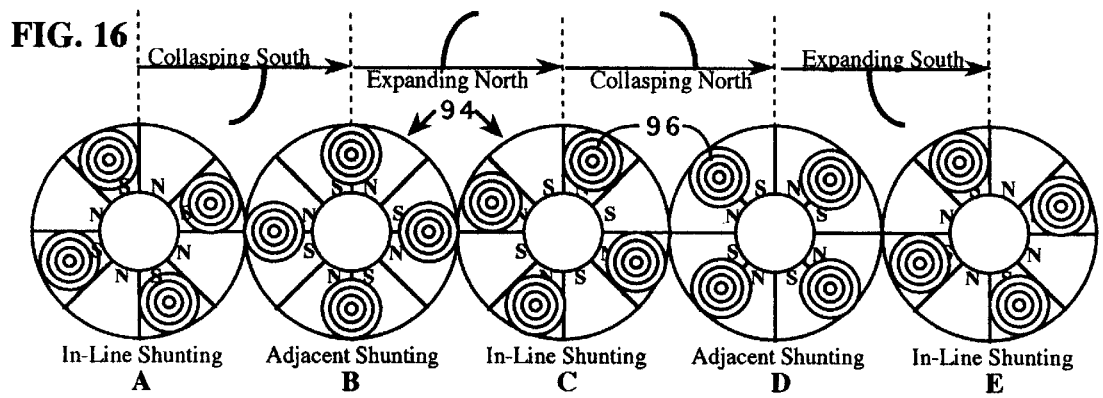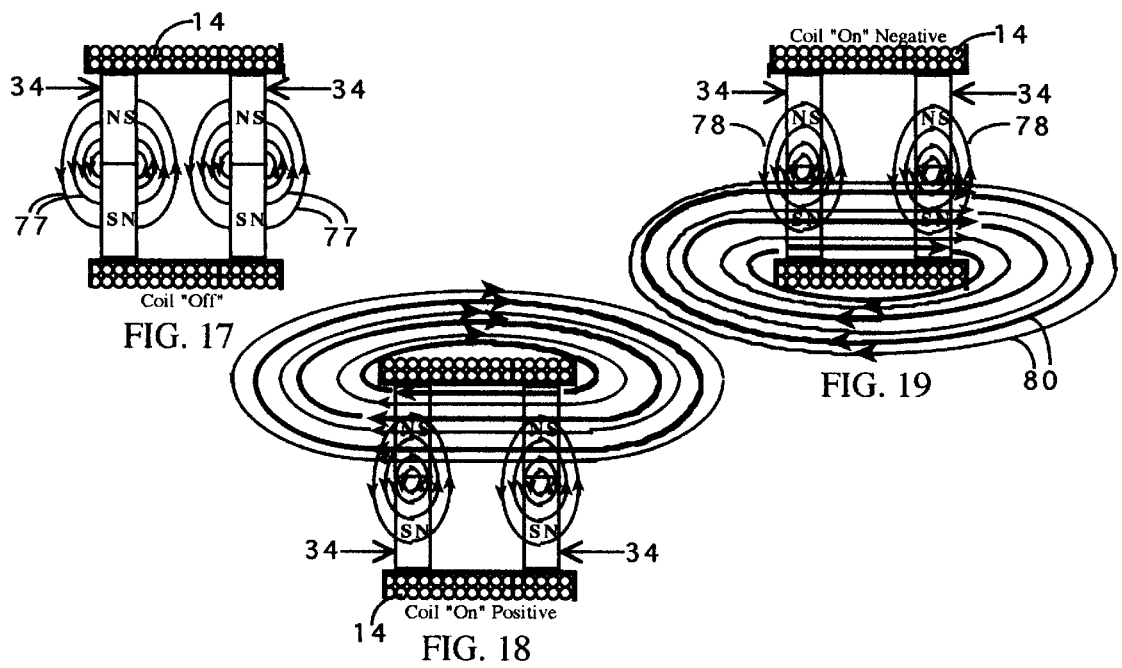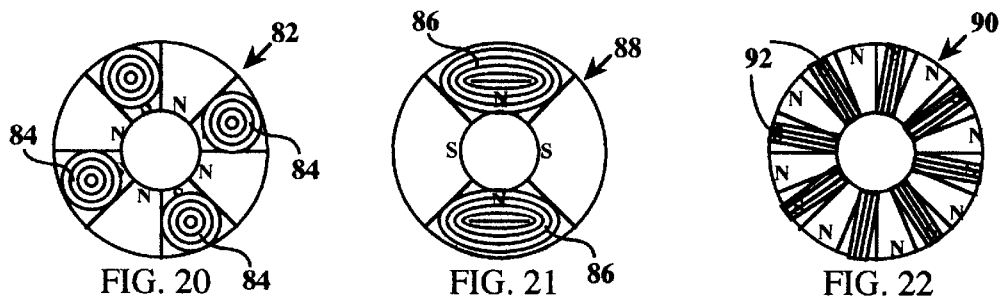

FIG. 23
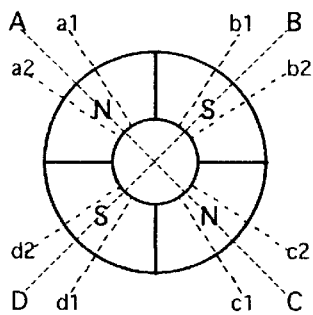
FIG. 24
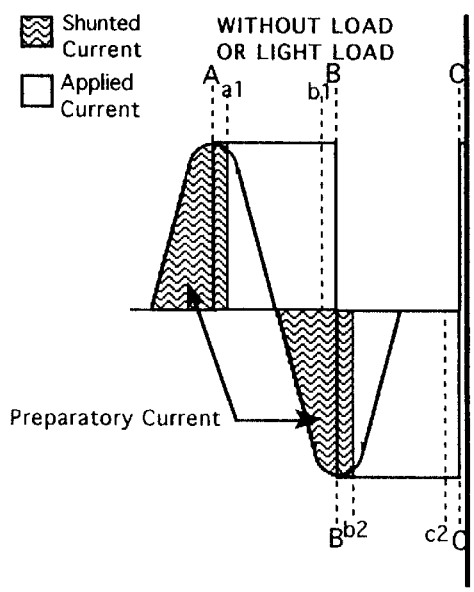
FIG. 28
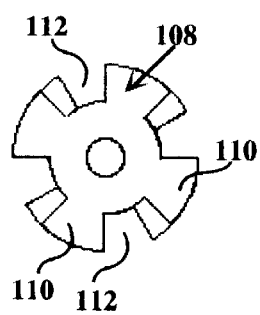
FIG. 25
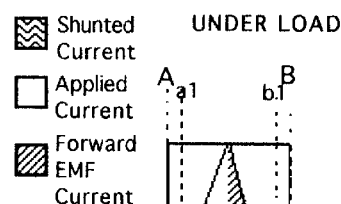
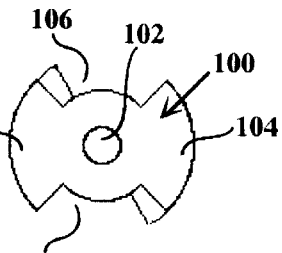
FIG. 26
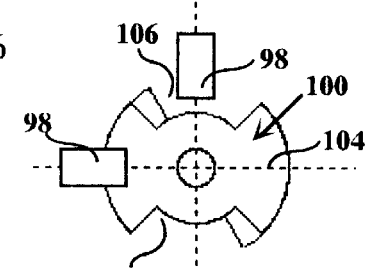
FIG. 27
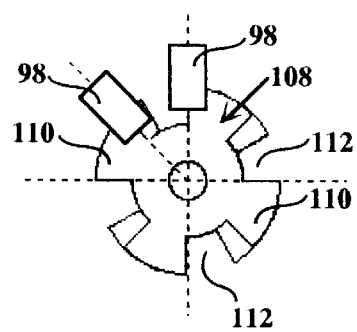
FIG. 29

Basic Waveforms Of Stern-Point Timing

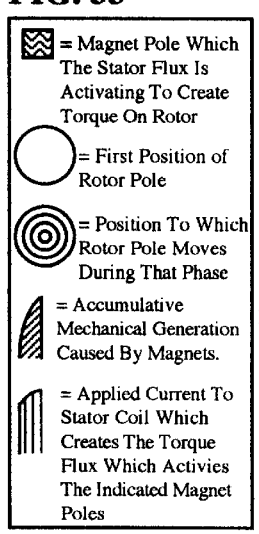
FIG. 33
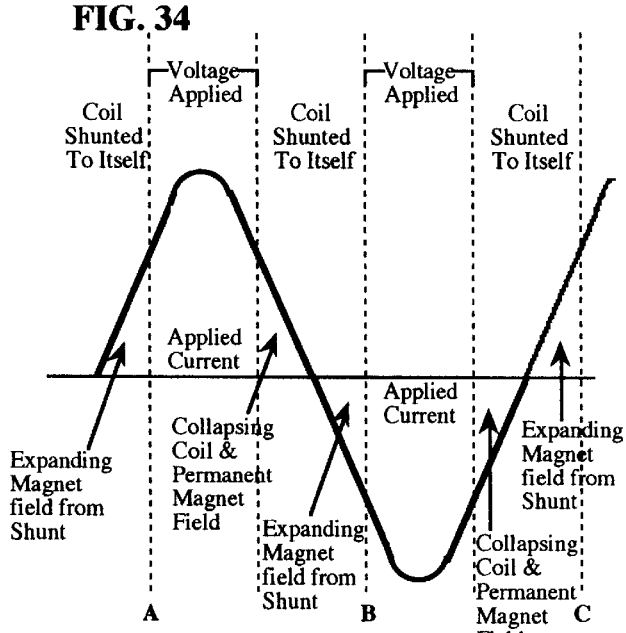
FIG. 34
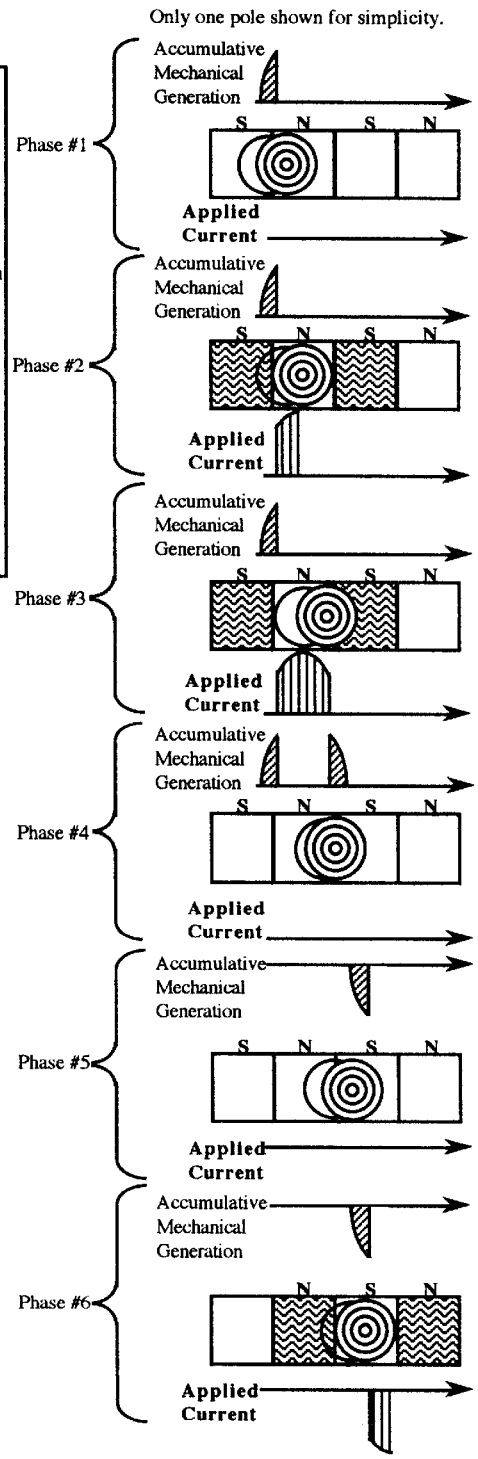

Single Rotor Flux Diode Motor in
High Torque/High Power Density
Configuration

FLUX DIODE MOTOR

BACKGROUND OF THE INVENTION

1. Field of the Invention

The invention pertains to the use of magnets, preferably permanent magnets, to efficiently utilize, regulate, and control magnetic forces in a motor or generator to increase the efficiency of the machine.

2. Description of the Related Art

In a conventional electric motor, the electromotive force (EMF) generated by the motor is 180° out of phase with the input voltage with respect to the waves of the generator and input voltages. This is because the electromechanical coupling which produces torque between the motor rotor and stator core and coil members generates the exact opposite EMF in the coils as the applied current which creates a coupling. This is the basic nature of conventional electric motors and generators.

In order for an electric motor to run, the input voltage at any revolution must be greater than the reverse generated voltage at that rate of revolution (RPM). A current will be established in the coils of a motor which is proportional to the difference between the applied voltage and the reverse generated voltage. For example, if the reverse generated voltage is 100 volts at 1800 RPM and 120 volts are being applied to the motor, then the amperage established in the coil will be that which can be accounted for by 20 volts at the ohms and inductances of the motor coils at that RPM. This is why a motor with a large number of turns cannot run but very few RPMs or produce little torque at low voltages. The moment the rotor starts moving in relation to the stator, it takes only a few RPMs to generate a reverse voltage nearly as great as the applied voltage. Since the rotor cannot turn any faster without generating a voltage higher than the applied voltage, and thus stopping the current flow through the coils all together, the motor cannot achieve any useful RPM or torque without the application of higher voltages. So even though high turn coils produce higher flux per-amp of current circulating, ampere-turns, they also generate more reverse EMF and thus require higher voltage. A new and more effective way of interacting with these counter electromotive forces is one of the primary benefits to which the invention is directed.

OBJECT OF THE INVENTION

The basic object of the invention is to provide an electric machine using a stator and rotating rotor wherein magnetic flux forces producing reverse electromotive forces are substantially eliminated or beneficially re-phased in an economical and practical manner to significantly increase the efficiency of operation of electrical machines such as motors and generators.

SUMMARY OF THE INVENTION

With the invention, permanent magnets are used in a flux-circuit in a manner similar to how a diode is used in an electrical circuit, and for this reason, the electrical machine of the invention is called a flux diode motor.

The invention uses permanent magnets in a stator or rotor assembly, or in a rotor assembly in proper relation to a stator assembly, so as to prevent the establishment of magnetic flux circuits in one direction and to encourage them in the opposite direction in certain areas of the rotor or stator assembly. This concept allows for a unique method of creating useful magnetomechanical coupling between the stator and rotor assemblies so as to produce a useful output at the rotor shaft, and unique generation of in-phase electromotive force in the stator or rotor coil or coils, depending on the design, in regard to the applied current.

The purpose of the invention is to develop an EMF machine which beneficially re-phases or eliminates the counter generation discussed above. It is apparent that if the counter generated EMF can be beneficially re-phased or eliminated, significant improvement in motor efficiency can be achieved as all of the applied voltage producing current in the motor coils, less coil inductance, will produce current flow. Further, in addition to eliminating or re-phasing the above discussed reverse generation, the practice of the invention produces a beneficial forward (in-phase) generation ahead of or behind the applied voltage. This arrangement results in a machine having very high efficiency. The forward generation creates a current "path" through the motor coils which is in-phase with the applied voltage. The result is that this forward EMF creates, underneath the influence of its current wave, a nearly resistance-less, timed current-path through the coil as a sine-wave. No matter how many turns are on the motor coils, as long as the coils are not physically too large to where the flux from the permanent magnets cannot generate a forward EMF on the outer turns of the coil efficiently due to too great a distance, they will generate this nearly resistance-less path at the same ratio to turns. As the number of turns go up, so does the in-phase forward-generation current, and since none of the coils or magnets of this type of motor move, the forward generation comes from these non-moving parts, and it puts no load on the rotor when the right kind of electronic triggering circuits are used.

The control of flux in accord with the invention is achieved by the use of permanent magnets arranged in a particular manner with each other and with magnetic flux shunts so that the magnets and shunts can function as unidirectional flux "gates", which can be used to manage flux much like diodes manage electric current.

It is commonly understood that a permanent magnet pole will only pass flux in one direction, i.e. from the south pole to the north pole. The magnet will not allow flux to pass from the north pole through to the south pole. Thus, if you have oppositely polarized poles on a magnet or multiple magnets arranged with their poles opposite in polarity, or in some way oriented differently, then you have a one-way flux "gate" which can be used to manage flux similar to the manner that multiple diodes manage electrical current.

It is commonly understood that a permanent magnet pole will function as above as long as the flux it opposes and re-directs in out-of-phase cycle does not exceed its coercive force. However, it has been demonstrated that often magnets can be driven well beyond their coercive force rating without any demagnetizing effect to the magnet as long as it is in the presence of at least one oppositely oriented adjacent pole in the same applied flux path. This is because permanent magnets do not merely "pass" flux in the south to the north pole direction; they provide a resistance-less flux path, a kind of "superconductivity" which attracts it. Thus, if one pole is in-phase with the applied flux, this will cause the applied flux and the flux of the in-phase pole to series. The result is that little demagnetizing force is exerted on the out-of-phase pole since the flux is attracted to the other pole. The in-phase pole offers little to no resistance while the out-of-phase pole offers high resistance. But it can still be understood that because there is a path through the in-phase pole for the applied flux to complete its magnetic circuit, then this will channel the full impact of the demagnetizing effect of the applied flux away from the out-of-phase pole. Therefore, this flux-diode type use of the magnets seldom, if ever, results in demagnetization of the permanent magnets. In fact, it tends to maintain the magnets at their peak magnetization because of the in-phase re-enforcement by the applied current to the magnetic poles' polarization.

Another reason congruent with this phenomenon is the fact that the presence of a near or adjacent oppositely polarized pole will allow the out-of-phase pole to complete its magnetic circuit through the adjacent pole while being opposed to the applied flux. When the applied flux is flowing through this adjacent in-phase pole, the magnetic conductivity of that pole is increased and it therefore "draws" or "attracts" the flux of the out-of-phase magnetic pole to itself more powerfully. Since this is the normal state of how most of the flux of the oppositely phased permanent magnet poles respond to each other, when not under any outside influence, it is not a totally imposed or unnatural condition for the flux circuit for the out-of-phase pole. Thus, in accord with the invention, the magnets perform very well and their fields remain stable under these conditions without any evidence of demagnetization due to use.

In the practice of the invention, the stator or rotor, or the stator/rotor combination assemblies, are so constructed as to create torque by summing applied flux from the coil(s) and the flux of the permanent magnet(s) poles. For example, when the flux diode configuration is designed into the stator, the magnets become the conductive material of the stator around which the stator coil is wound. In such instance, the flux of the stator magnets take their normal paths and complete their paths through each other. When the stator coil is "on" in one direction or the other, the flux from the stator coil is channeled through the in-phase poles and the flux of the in-phase poles is summed with the stator coil flux and thus conforms its path to that of the stator coil flux. The permanent magnet flux from the in-phase poles generates an EMF as it changes its geometric configuration. This generated EMF, when the apparatus of the rotor and stator is combined, has a relationship to the rotor and stator functional interdependent design which develops a forward EMF ahead of or following the applied run-current to the motor. By the use of periodically applied current with trailing voids (time following an applied current where there is no current to the motor at all), with the configuration of this invention, it is possible to re-phase these counter EMF's so they become beneficial to the application of current, or getting torque out of the motor, rather than detrimental. The out-of-phase poles in each cycle "shunts" back through the in-phase pole.

The type of rotor used in accord with the invention can be of several types. It can have permanent magnet poles or soft magnetic poles such as laminated or insulated soft iron poles. It can have coils or no coils. The type of rotor used is determined by the type of stator used. The number of poles on the rotor is determined by the number of magnetic poles used on the stator magnet(s). If the stator magnet(s) have four poles, then the rotor will have two poles. If the stator magnet(s) have eight poles on each magnet, then the rotor will have four poles, etc. In this embodiment of the apparatus, the rotor will always have one-half of the number of poles of their stator magnet(s). The interaction of the stator magnets and coils with the rotor is necessary to understand in regard to the uniqueness of the invention. Referring to the rotor poles as laminated shunts, as is descriptive of their function in relation to the magnetomechanical coupling between the rotor and stator magnet poles and the stator coil(s). They provide a connection (a ferromagnetic path) for the permanent magnet and coil flux. The magnetic polarity of each pole of each magnet is used like a flux diode to create different flux circuits. The permanent magnet pole will only allow flux from the stator coil to pass in one direction (as long as the flux density applied by the stator coil to the flux circuit does not exceed the coercive force of the magnet). Thus, the alternating flux from the stator coil(s) is channeled through the poles of the magnet(s) to create a spinning magnetic field. The laminated shunts of the rotor follow this spinning magnetic field.

As the laminated shunts of the rotor follow the spinning stator field creating continuous torque on the motor shaft, they not only "shunt" between magnets and thus create a ferromagnetic path for the coil flux, but also "shunt" between the poles of the same magnet. It is the alternating pattern of these two different types of "shunting" which plays a major role in creating the unique and important characteristics of the invention—in-phase generation. These two kinds of "shunting" will be easier to distinguish if they are named. Accordingly, the shunting between adjacent poles on the same magnet will be called "adjacent shunting". The setting up of a flux path through and around the stator coil by "shunting" with the in-phase poles of the same polarity on magnets behind or in front of a magnet's poles, and/or summing of the in-phase poles of a magnet(s) with the stator coil flux will be called "in-line shunting".

The alternating pattern of these two shunting effects and the alternating flux of the stator coil(s) creates a combined pattern. If X is the flux from the stator coil which travels through the N-S poles of each stator magnet(s), and if O is the opposite flux from the stator coil which travels through the S-N poles of each stator magnet(s), then in combination with the flux from the stator magnets and the two different kinds of shunting described above, the pattern is as follows:

When the motor is running, the rotor shunts are torqued from the center of one set of in-line magnet poles to the center of the next adjacent set of in-line magnet poles. If we begin the description with the rotor shunts in the center of the S-N poles' faces, it is at this point that the stator coil passes its X flux through its center and the magnets direct the flux to the N-S flux circuits. As a result, there is more flux density passing through the N-S poles of each magnet than the S-N poles. This causes the flux from the N-S poles to sum with the stator coil flux thus causing in-line shunting of all the N-S oriented poles in the stator coil. This also causes the flux from the S-N poles to shunt very tightly through the nearest adjacent N-S pole. The result is very high flux density in the N-S poles with an in-line orientation due to their own magnetism and the stator coil's flux. The presence of the flux from the adjacent poles shunting through the N-S poles also increases their flux density.

Under these conditions, a strong torque is exerted on the rotor shunts, which are in the air gap between the magnets, to move them from the center of the S-N magnet pole faces to the center of the N-S pole faces. This is due to two flux interactions: 1) as all the S-N magnet poles flux is moving to adjacent-shunting through the N-S magnet poles, this exerts a torque on the rotor shunts, which on its own would move the rotor shunts between the S-N and the N-S poles faces; 2) at the same time, the concentration of flux in the N-S pole faces, creating high flux density and in-line orientation of all the N-S flux and coil flux, is torquing on the rotor shunts in the same direction to pull them to the center of the N-S pole faces.

As the rotor shunt reaches the center point between the two adjacent pole faces, the applied current is turned "Off"

and the motor run-circuit shunts (shorts) the stator coil back to itself. What happens next depends on the load and applied voltage and current levels under which the motor is running. If it is under light load, and thus lower current levels, one kind of flux condition occurs. If it is under heavy load, and thus higher current levels, then a different flux condition is created. In between a light or heavy load, the motor moves linearly between the one and the other of these two conditions and exhibits characteristics of both in a "seesaw" manner (as one set of characteristics is decreasing, to the same extent the other set increases).

First, if the motor is under light load, the nature of the counter-EMF in the stator coils is such that with the rotor shunts moving between the S-N and N-S pole faces, the applied current has been driven to zero. When the circuit turns the applied current "Off" at this point, there is no current in the coil to cause a forward EMF and the flux established in the coil will not collapse and cause a forward EMF because of the rotor shunts moving into place to reinforce the in-line shunting configuration. Even through the stator coil flux will now start to decline, the rotor shunts are still being torqued by the concentration of flux created in the N-S pole faces. This causes the rotor shunts to continue moving to the center of the N-S pole faces, and as they do so, reinforcing the in-line shunting of the N-S pole faces, this causes the N-S pole's flux to continue to expand outward through the stator coil, which is shorted to itself, and this generates a current in this trailing void (time period following the former applied current wave in which no current is applied to the motor coil) which is in the same direction as the next applied current wave which is to follow it.

This current is generated by the non-moving magnets and the magnetomechanical relationship of the rotor to the torque flux is such that it not only does not put a load on the rotor, it continues the torque which was initiated by the previously applied current. Thus the torque output is continued even while this current wave is being generated in the opposite direction.

Since the stator coil is shorted to itself, the generation by this continuing expansion of the magnet flux of the N-S poles results in only enough voltage to pass its current through the circuit (about 1 volt) and the rest of the EMF potential is transformed into current flow in the coil. This generates the beginning of the other side of the sine-wave and overcomes the inductance to the establishment of current in that direction through the stator coil.

When this part of the other side of the sine-wave is at its zenith, the rotor shunts have reached the center of the N-S pole faces. At this point, the circuit applies current in the same direction as the expanding magnets have been generating (which is the opposite of the previously applied current) and because the current is already established in the coil by this generation, the applied current wave encounters no inductance at all to establishing itself up to the level of the generated wave which preceded it. This results in an instantaneous rise of the applied current in the coil with no inductive slope at all. This applied current direction results in the stator coil generating the O flux through its center which is controlled and directed by the magnets through the S-N poles. This causes the N-S poles to lose the in-line shunting configuration and collapse in through the coil and into an adjacent shunting configuration through the S-N poles, and the series-ing of the S-N poles with the stator coil flux causes high flux concentration in the S-N poles. This results in the rotor shunts beginning to torque from the face of the N-S poles to the face of the S-N poles.

The above is a description of what takes place if the motor is under light load and low current application. Going back now to the same point in the motor's rotational phases where beginning describing the light load characteristics (the rotor shunts are at the center point as they move between the S-N and N-S pole faces, and the current has just been turned "Off" by the circuit, and the stator coil shorted to itself), described below are heavy duty characteristics.

If the motor is under heavy load, then when the current is turned "Off" as the rotor shunts reach the center point between the S-N and the N-S pole faces, and the stator coil is shunted (shorted) back to itself, the current in the stator coil is at its peak because of the greater applied voltage and the flux expansion of the N-S poles has been accelerated to maximum through the stator coil. As the flux expansion of the N-S poles by the stator coil is now greater than that which the rotor shunts can maintain by themselves, when the circuit shorts the stator coil, it results in a very large forward EMF being generated by the collapsing field of both the coil and the magnet poles. Since the N-S pole flux can only collapse down to the level which the rotor shunts can maintain as they move into the center of the N-S pole faces, the flux intensity goes down slowly thus continuing a very strong torque on the rotor shunts which are moving to the center of the N-S pole faces. The generated current in the coil keeps reestablishing the field which is trying to collapse and thus lags its collapse.

Since this takes place from the center point between the two adjacent pole faces and the center of the N-S pole faces, it is in the last half of the mechanical torque cycle (remember the rotor shunts are torqued from the center of one set of poles to the center of the next adjacent set of poles.) This adds much to the torque output during this cycle even though there is not power being applied to the motor. Also, there are no counter EMF's during this part of the cycle to counteract this forward EMF and the work it is doing. This results in great efficiency increase in the motor's output.

As the rotor shunts reach the center of the N-S pole faces, the flux in the N-S poles has collapsed as far as the rotor shunts will allow, bringing the forward generated EMF in the coil to near zero. At this point, the current is turned "On" by the circuit in the opposite direction. This results in the stator coil generating the O flux through its center which is controlled and directed by the magnets through the S-N poles. This causes the N-S poles to lose the in-line shunting configuration and collapse in through the coil and into an adjacent shunting configuration through the S-N poles, and the series-ing of the S-N poles. This results in the rotor shunts beginning to torque from the face of the N-S poles to the face of the S-N poles.

Depending on the load and applied current characteristics, the torquing of the rotor shunts from the center of the N-S pole faces to the center of the S-N pole faces will repeat what is described above only in opposite polarity, resulting in the rotor shunts once again being positioned over the S-N pole faces. The cycle then repeats.

The above description will become clearer upon description of the embodiments of the invention illustrated and described below. However, the electrical aspects of a motor utilizing the inventive concepts can be appreciated from FIGS. 8–11, which show center-point triggering of the motor circuit, which will be explained and distinguished from stern-point triggering of the motor circuit later in this application.

FIG. 8 illustrates a sine-wave representing the EMF generated in the motor coil when the motor is running. This sine-wave is perfectly in-phase as a forward EMF with the applied voltage and current which creates motor torque. In FIG. 9, the applied voltage is represented. This applied voltage is about 60 percent of each half-cycle. FIG. 10 represents the appearance of the applied current (amps). It will be noted that since the applied power does not come on until about 20 percent into the half-cycle wave of the forward EMF, that when the voltage is applied, the current goes instantly to the level of the forward generation, and this demonstrates the inductance effect in a 2600 turn stator coil is "0" up to the level of influence of the forward EMF. Accordingly, there is no current rise slope. FIG. 11 represents the overlaying of FIGS. 8 and 10.

Notice that on the back half of the applied current wave, FIG. 10, that even though the square-wave applied voltage stays at the same level, the current flow through the coils follows exactly the sine-wave-effect of the forward EMF. This demonstrates that the forward EMF is primarily responsible for the current flow, and is what creates a conductance through the coil, not merely the applied voltage. By the practice of the invention, very low voltages can be used to put useful current levels through very high-turn-coils without the usual level of counter EMF being generated to shut the motor coil down. Thus, very high ampere-turns can be achieved at very low watts.

One of the unusual characteristics of the invention is how the forward EMF, a generated EMF produced during the torque cycles of the motor before or after the applied current which is in perfect phase with the applied voltage and current, interacts with the applied current. To the inventors' knowledge, there is no other known electric motor which has this characteristic.

If an electric machine in the form of a generator utilizing the invention is rotated at about 4000 RPM, totally unloaded and having an open circuit, it will generate a voltage potential of around 50 volts. If the stator coil is then shunted to itself placing a maximum load on the circuit, the voltage will drop to around 1 volt, and the resulting current flow from the stator coil will be about 0.200 amps RMS. However, since this generated current is always in phase with any voltage or current applied to the device when it is used as a motor, and since any voltage and current source used, such as a power supply or a battery, is seen by the stator coil of the motor as a conducted connection (a dead short), this generated forward EMF flows through the circuit as almost 100 percent current and not voltage, similar to the shorting out of a generator. However, it does not create a load in the presence of an applied current. If the applied current and voltage is brought up to the point that the motor is running 4000 RPM (about 38 volts), the total current flow in the circuit will be 0.200 amps RMS, the same as the motor generates at that RPM when at maximum load, which is what the stator coil is seeing at that very moment as it is powered by the applied current source.

In normal circumstances, the circuit that is employed to apply power to the motor only applies power periodically to each half-cycle, and that, right in the middle of the forward-generated sine-wave when center-point triggering is used. When the circuit is not applying current to the stator coil, it shunts the stator coil to itself so that any generated current from the stator coil can flow back into the stator coil. The result is that the current-flow in the coil is a perfect sine-wave at all times, even though the applied current is a modified sine-wave with the front and back of each half-wave cut off. This demonstrates that the current generated from the stator coil supplies the needed current levels to maintain the full current flow in the circuit at all times.

One other important characteristic of the invention which contributes to greater efficiency is that the core for the stator is permanent magnets which makes for a per-saturated core to the level of the magnets br. This means that as the coil uses the in-phase magnet poles as its core, no energy is lost in saturating the stator core of these poles since they are already nearly saturated. And since none of the flux will pass through the out-of-phase poles, no energy is lost.

The result of the producing of electric machines such as motors and generators in accord with the inventive concept is to provide very high efficiency machines even of small and fractional horsepower. Such machines produce the desired torque output without the creation of appreciable heat resulting in long life and low operating costs. Embodiments utilizing the inventive concepts are described below.

BRIEF DESCRIPTION OF THE DRAWINGS

A fuller understanding of the invention, and an appreciation of its objects and advantages, will be apparent from the following description and accompanying drawings wherein:

FIG. 1 is an elevational diametrical sectional view of an electric motor utilizing the inventive concepts, FIG. 2 is an elevational view of the magnets used with the motor of FIG. 1, FIG. 3 is an elevational view of the rotors containing circular laminated shunts as used with the embodiment of FIG. 1, FIG. 6 is an exploded schematic view of magnets and shunts illustrating the flow of flux to the right, FIG. 7 is a view similar to FIG. 6 illustrating the movement of magnetic flux to the left, FIG. 8 is a graph illustrating the EMF generated in the motor coil when the motor is running, FIG. 9 is a graph illustrating the applied voltage existing in the motor, FIG. 10 illustrates the characteristics of the applied current in a motor in accord with the invention, FIG. 11 illustrates the overlaying of the graphs shown in FIGS. 8–10, FIG. 12 illustrates the applied current flow from the power source, FIG. 13 illustrates the current flow in the coil at all times, FIG. 14 illustrates the applied current flow from the power source when the motor is running on half-cycle, FIG. 15 illustrates the current flow in the coil at all times when the motor is running on half-cycle, FIG. 16 is a schematic representation to illustrate the flux generated in the stator coil by the permanent magnets by the alternation of "adjacent shunting" and "in-line shunting", FIG. 17 illustrates the relationship of the coil off and only adjacent shunting existing, FIG. 18 illustrates the position of the magnetic flux and field with the coil on and both adjacent and in-line shunting occurring, FIG. 19 illustrates the magnetic flux when both adjacent and in-line shunting occurs and the coil is "on" negative, FIG. 20 is a schematic representation of the poles on the rotor wherein four pole shunts are disclosed, FIG. 21 illustrates an embodiment of rotor construction wherein the laminations are horizontal to the direction of rotation tending to unbalance the poles' shunting tendency, FIG. 22 is an embodiment of rotor construction illustrating radially oriented poles, FIG. 23 is an elevational illustration of a four pole stator magnet illustrating portions of the magnet having maximum torque, FIG. 24 is a graph illustrating the shunted current wave when the motor is without load, FIG. 25 is a graph illustrating forward EMF current with the motor under load, FIG. 26 is an elevational view of a slotted disk used to trigger the stator circuit as used with a four pole stator magnet assembly, FIG. 27 is a schematic illustration of the location of the slotted optical switches used in conjunction with a four pole stator magnet, FIG. 28 is a view of a circuit triggering timing disk employed with an eight pole stator magnet assembly, FIG. 29 is a schematic view of the slotted optical switches used in conjunction with the timing disk of FIG. 28, FIG. 33 is a schematic view of the relationship between the rotor magnet assemblies and the rotor pole shunts during the six phases of operation when using center-point timing, FIG. 34 is a graph illustrating the basic wave forms existing during center-point timing, FIG. 38 illustrates a magnet having 32 poles on each face. FIG. 39 illustrates a pole rotor having 16 laminated poles. FIG. 40 illustrates the assembled motor using the types of magnets and poles shown in FIGS. 38 and 39, FIG. 49 illustrates eight magnets magnetized with a radial orientation, FIG. 50 is another view of the magnet assembly, FIG. 51 is an end view illustrating the orientation of the four laminated rotor shunts, FIG. 52 illustrates the flux paths during Phase #1 and Phase #2, and FIG. 53 is a diametrical sectional view of the assembled motor utilizing the components and features shown in FIGS. 49–52.

DESCRIPTION OF THE PREFERRED EMBODIMENTS

Figure 4:
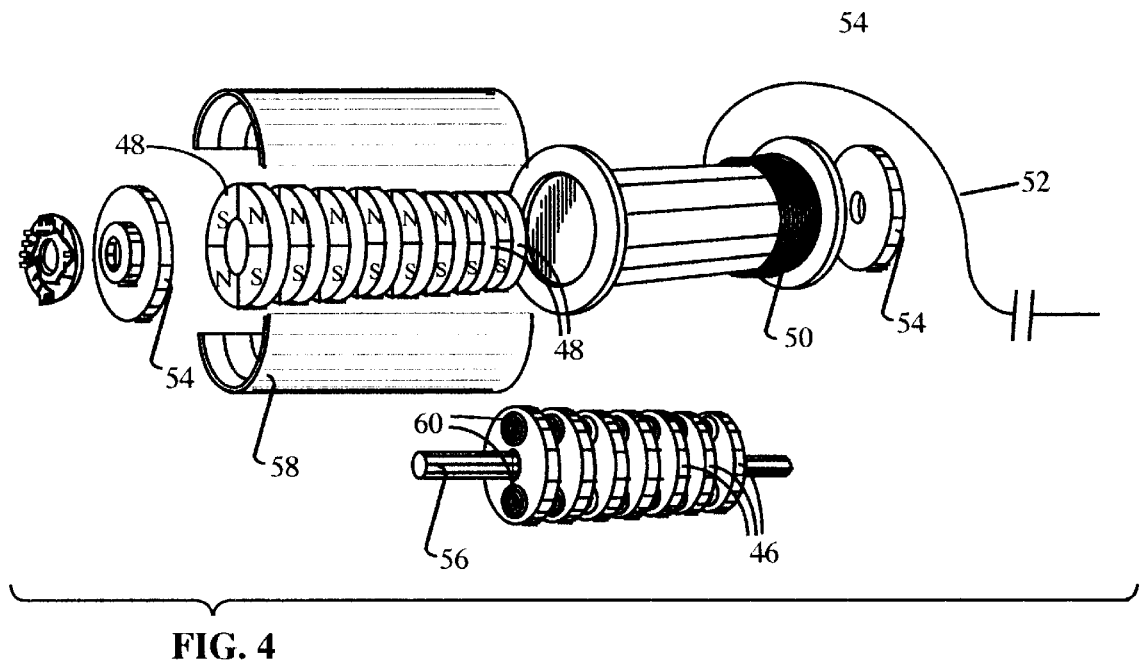
FIG. 4 is an exploded view of the electric motor represented in FIG. 1.

Electric machines utilizing the concepts of the invention include electric motors and electric generators, and because of the unusual nature of the invention, the particular form of the electric machine embodiment utilizing the inventive concepts may significantly vary. However electric machines using the invention must incorporate the basic novel concepts as discussed above, and below.

In FIG. 1, an embodiment of an electric motor is illustrated wherein the novel structural features required are present. In the electric motor 10, a circular stator 12 is represented having a large number of turns of wire wherein the coil 14 forming the stator receives alternating current using the modified sine-wave of the invention.

The motor 10 includes nonmagnetic end plates 16 and 18 through which the motor drive shaft 20 extends, and is rotatably supported on bearings 22 and 24, respectively, usually of the anti-friction type. In FIG. 1, the left end 26 of the drive shaft 20 extends sufficiently beyond the end plate 18 so that a torque transmitting drive member, not shown, such as a gear, pulley, sheave or sprocket may be affixed thereto in the known manner.

The motor rotor generally indicated at 28 is fixedly mounted upon the drive shaft 20, and in FIG. 1, the rotor consists of three axially spaced nonmagnetic thermoplastic circular segments 30. Each of the segments 30 includes a pair of circular laminated shunt poles 32 extending through the rotor segments in an axial direction. The diametrically opposed relationship of the poles 32 upon the rotor segment 30 will be appreciated from FIG. 3. The shunt poles 32 are formed of a ferromagnetic laminated material capable of readily conducting magnetic flux.

In the motor embodiment of FIG. 1, four circular magnet assemblies 34 are located within the stator coil 14 and are axially spaced along the drive shaft 20 between end plates 16 and 18. Two of the magnet assemblies 34 are located adjacent the end plates, and the other two magnet assemblies are located between rotor segments 30 as will be appreciated from FIG. 1.

The magnet assemblies 34, shown in detail in FIGS. 2, 6 and 7, each comprise a circular disc configuration as will be appreciated from FIGS. 6 and 7. Each magnet assembly consists of four magnets 36, 38, 40 and 42 bonded together and each is polarized in an axial direction, and each magnet assembly consists of the four magnets each constituting a 90° segment of the associated assembly, the polarity of the magnet segments is indicated by the letter N, North pole, and the letter S, South pole. The magnet assemblies 34 each include a central hole 44 through which drive shaft 20 extends and the assemblies 34 do not rotate, and are fixed within the motor 10 at the axially spaced locations which will be apparent from FIG. 1.

FIG. 4 describes another embodiment of an electric motor using the inventive concepts wherein seven rotor segments 46 are used in conjunction with eight magnet assemblies 48. In FIG. 4, the stator coil is illustrated at 50 having a partially wound coil wire 52 represented. The motor end plates are shown at 54 and contain the bearings for rotatably receiving the motor drive shaft 56. An inner dielectric divided sleeve 58 is located within the stator coil 50 having ribs molded therein for receiving the magnet assemblies 48, and in this manner the sleeve 58 will position the magnet assemblies 48 in spaced relationship between rotor segments 46 and maintain the magnet assemblies stationary. The rotors 46 each include two laminated shunt poles 60, as in FIG. 3, and the components are assembled in the relationship identical to that previously described with respect to FIG. 1.

Figure 5:
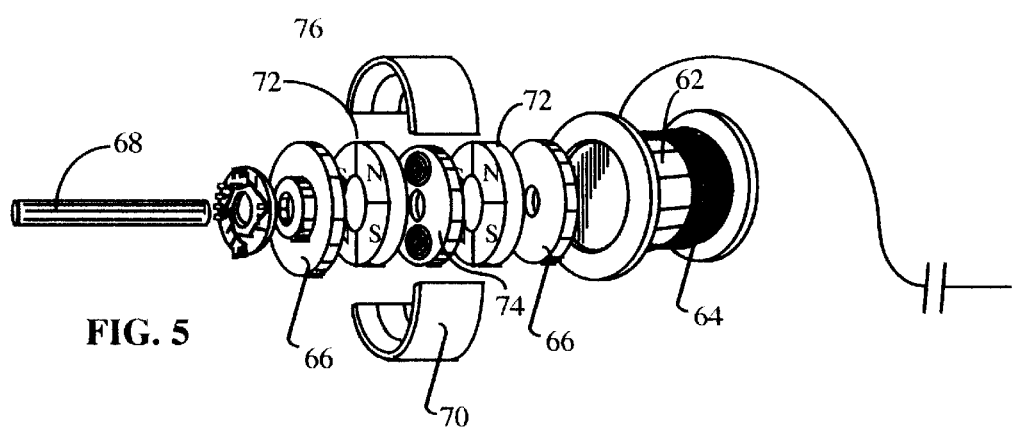
FIG. 5 is an exploded view of a single rotary version of a motor utilizing the inventive concepts.

Another embodiment of the invention is shown in FIG. 5 wherein a single rotor version of a motor utilizing the invention is illustrated.

In FIG. 5, the stator 62 has the coil 64 wound thereon. End plates 66 seal the ends of the motor and rotatably receive the drive shaft 68. A dielectric plastic sleeve 70 is located within the stator for supporting the two magnet assemblies 72 which are identical to those previously described. The rotor 74 affixed to the shaft 68 is dielectric and identical to the previously described rotor segments and includes two diametrically opposed laminated shunt poles 76 for controlling the magnetic flux in accord with the inventive concepts.

The fundamentals of the practice of the invention are the same in the machines shown in FIGS. 1, 4 and 5, and the inventive concepts are practiced by all of these embodiments as the magnetic flux is controlled by the stator coil and the rotating shunts.

The magnet assemblies used in the motor shown in FIGS. 1, 4 and 5 are of a disc-like configuration having a central opening 44, FIG. 2, through which the motor shaft extends, and each magnet assembly consists of four polarized segments extending through 90° of the assembly wherein the poles are located at the assembly lateral sides and the polarity is indicated as in FIGS. 6 and 7. Accordingly, it will be appreciated that as each pole of a magnet segment will only pass flux in one direction, from the South face through to the North face, the assembly of oppositely polarized poles on a multiple magnet disc as disclosed arranged with their adjacent poles in opposite polarity, the magnet assemblies function as one-way flux "gates" which manage flux flow in a manner similar to the manner in which multiple diodes control electric current.

As explained earlier, the "shunting" caused by the rotor shunts or poles 32 is of two kinds. The "adjacent shunting" shunts a North and South pole on the same magnet assembly 34 to each other. In "in-line" shunting, the magnetic flux shunts a North pole and a South pole on different magnet assemblies 34 to each other. Both of these kinds of "shunting" have an effect on the stator coil. The in-line shunting causes a flux from like oriented poles from a set of stator magnets to sum together and expand outwardly through the stator coil(s) and induce a voltage which generates part of the sine-wave. The adjacent shunting causes the same magnetic poles to un-series and to shunt to adjacent poles on the same magnet assembly, causing the flux which has expanded outwardly through the stator coils to collapse downward back through it and thus helps generate the other parts of the sine-wave as later explained. This alternate expanding and collapsing flux through the stator coils is part of what causes the in-phase generation in relation to the applied motor run-current. The stator coil augments this to bring it into phase with the applied current by causing this mechanical shunting to be temporarily overridden and moved ahead one set of magnet poles, which changes the polarity of the expanding flux and thus causing a forward generated EMF from the magnet poles on itself instead of a counter EMF. (This also overrides the effect of most of the coil's inductance.) The stator's temporary overriding of this mechanical shunting is what causes the flux to lead the rotor shunts by one set of magnet poles causing torque and thus it shifts the generation between the rotor shunts and the stator coil by means of series-ing with the magnet poles always ahead of the rotor shunts. And since every set of magnet poles which is one set ahead of the position of the rotor always has a polarity which is opposite to the magnet poles where the rotor shunt is positioned, it shifts part of the generated EMF to a forward instead of a counter.

It needs to be appreciated that this mechanical "shunting" not only causes this flux movement from the permanent magnets, but also provides a moving mechanical ferrite path for the flux from the stator coils which is being directed by the poles of the magnet. As the magnetic poles of the magnets "channel" flux, and thus create a spinning field, the ferrite poles 32 of the rotors not only are attracted into this spinning field and follow it, but as they do so, they also replace most of the air-gap between the magnets with ferromagnetic material, thus making the flux path more conductive for both the stator coils flux and the permanent magnet flux.

In this configuration, the phasing which creates torque on the rotor in relation to the stator, is also the exact same phasing which creates this in-phase generation in regard to the applied current to the stator which is creating the flux for the torque, if the stator coil is shunted (shorted) to itself between the applied pulses.

The flux generated in the stator coil by the permanent magnets by the alternation of "adjacent shunting" and "in-line shunting" are represented in FIG. 16 where various rotative positions of a rotor and its shunting poles are disclosed in positions A–E. In FIG. 16, the magnet assembly 94 has eight magnets and the four rotor shunts 96 of a rotor segment are shown as superimposed over the magnet assembly. A, C and E represent "in-line shunting" positions as the shunts 96 directly align with a magnet, while positions B and D represent "adjacent shunting" positions as the shunts 96 straddle two adjacent magnets. Rotation of the rotor shunts 96 from position A to position B produces a collapsing South pole while rotation from position B to position C represents an expanding North pole situation. Rotation from the position C to position D represents a collapsing North pole situation, and rotation of the rotor from position D to position E illustrates an expanding South pole condition. Again, it must be remembered that this is a description of the mechanical generation due to the rotor shunts interacting with the stator magnet poles, and that when the stator coil is activated by applied voltage and current in a proper timed sequence, it temporarily overrides this mechanical alternating pattern at certain points and moves the flux expanding magnet poles ahead by one oppositely oriented set by means of summing with those poles just ahead of the rotor shunt's position. It is this which brings the generated EMF into phase with the applied current.

In conventional motors, the current which creates the torque phasing and induced generation in the coil are not in-phase, but out-of-phase, thus countering each other. With the invention, the inductance of the stator coil is largely cancelled at certain points by this synchronous phasing. No matter how many turns are added to a coil under the above described conditions, there is little to no phase-shift or "lag" in the applied field. The applied field always follows perfectly the generated field in the stator coil caused by the permanent magnets summing with it. The applied current is not "turned on" until the generated sine-wave is well begun. When the applied current does go "on", there is no inductance slope in the amperage wave. Rather, it goes "straight up" to the level of the generated current as will be appreciated from the description below relative to FIGS. 8–15.

As has been stated, the "shunting" described above is partly due to the alternating flux from the stator coil. Such shunting is designated as "flux induced shunting". Flux induced shunting will be appreciated by reference to FIGS. 17–19. In FIG. 17, the coil 14 is "off", and the magnet assemblies 34 are as illustrated having the disclosed flux lines. In FIG. 17, only adjacent shunting is occurring at flux lines 77. In FIG. 18, the coil 14 is "on" in a positive manner, and both adjacent and in-line shunting is occurring. In FIG. 19, the coil 14 is "on" negative and adjacent shunting is occurring at flux lines 78, while the in-line shunting is occurring at flux lines 80. The adjacent shunting of the out-of-phase poles caused by the coil is a side effect of the in-line shunting caused by the in-phase poles and also caused by the coil. As will be appreciated from FIGS. 17–19, without the presence of the rotor shunt poles 32, the stator coil will cause the same kind of "shunting". However, when both mechanical and flux induced shunting are combined, a more powerful "shunting" effect is achieved.

The rotor poles or shunts 32 can be made of almost any flux conductive material. The more highly magnetic the shunt material is while remaining magnetically "soft", the better for efficiency. Depending on the highest frequency at which the stator coils are to be driven, and taking into account that every time the stator coil reverses its field, the rotor shunts will "follow" and do the same, the magnetic hardness and softness of the material to be used can be calculated. By using a laminating coil of the material and insulating between the layers of the coil, optimum characteristics can be achieved. Ferromagnetic shunts have worked well, but it is appreciated that shunts or poles made of powdered metal or powdered technologies are suitable.

It is desirable that the size of the poles or shunts 32 on the rotors be matched as closely as possible to the size of the poles on the permanent magnets of the stator magnet assemblies 34. The number of poles on a magnet assembly 34 will determine not only the number of shunts 32 on the rotor, but will equally determine the shape. Various shapes of rotor poles or shunts are shown in FIGS. 20–22 as superimposed over various magnet assemblies. In FIG. 20, an eight magnet assembly 82 is illustrated associated with four circular poles or shunts 84 positioned at 90° relationships. In FIG. 21, the rotor shunts 86 are of an elliptical configuration as related to a four magnet assembly 88, and constitute a greater portion of the rotor configuration than those previously illustrated. The elliptical configuration of the shunt poles 86 of FIG. 21 tends to unbalance the poles' shunting tendency toward a preference for "adjacent shunting" while a shunt configuration such as shown in FIG. 22 wherein magnet assembly 90 has narrow magnets and the narrow shunts 92 tend to unbalance the rotor assembly's shunting tendency toward "in-line shunting". The use of a shunt configuration which returns back on itself in a balanced fashion tends to give the more balanced tendency between the two shunting effects. Also, this balance of the two shunting effects is best maintained if the laminated shunting poles are never larger than the magnet poles. If the rotor shunting poles are larger than the magnet poles, adjacent shunting effects tend to dominate.

Operating conditions of an electrical machine in accord with the inventive concepts are shown in the graphs of FIGS. 8–15. FIG. 8 illustrates the EMF generated current wave in the stator coil when the motor is running. This current wave is perfectly in-phase as a forward EMF with the applied voltage and current which creates motor torque. In FIG. 9, the applied voltage is represented. This applied voltage consists of approximately 60° of each half-cycle.

FIG. 10 represents the applied current (amperage). It will be appreciated that, since the applied power does not come on until about 20% into the half-cycle wave of the forward EMF, when the voltage is applied, the current goes instantaneously to the level of forward generation as represented at "a". This demonstrates that the inductance effect in the high turn stator coil is cancelled up to the level of influence of the forward EMF. Accordingly, there is no current rise slope. It is to be noticed that on the back half of the applied current wave "b" that even though the square wave applied voltage stays at the same level "c", FIG. 9, the current flow through the coil follows exactly the sine-wave effect of the forward generated EMF "b". This demonstrates that the forward generated EMF is in some way partly responsible for the current flow, and is what helps create a conductance through the coil, not just merely the applied voltage. Accordingly, extremely lower voltages can be used to put useful current levels through very high-turn-coils with little counter EMF being generated to shut it down. Thus, very high ampere turns can be achieved at very low watts.

FIG. 11 represents the overlaying of the graphs of FIGS. 8–10.

In accord with the invention, the circuits are designed so that they shunt the stator coil back to itself anytime there is not applied voltage. This allows the forward EMF to continue being generated as mostly current and not voltage. Accordingly, the current in the stator coil will be a perfect uninterrupted sine-wave even though the applied voltage from the circuit to the motor coil is a quasi-sine-wave with voids. These conditions illustrated in FIGS. 8–11 have to do with the characteristics of the invention when wrapped with a very high turn stator coil and center-point triggering is used.

As long as the current being generated in the stator coil has applied voltage, thus it is able to flow like current from a "dead-shorted" coil using the power supply as its path, or it is shunted (shorted) back to itself when there is no applied current, it creates little to no load on the rotor. This characteristic significantly differs from normal electrical machines wherein the shorting out of the coils produces maximum load. If the machine of the invention is used as a generator at full, dead-shorted load, it will show a load up to about 100 RPM. But at 100 RPM and beyond, nearly all load disappears (down to within 1 watt of the up-front mechanical load) while the motor continues to generate current at very low voltage. The total output wattage at this point is slightly less than one watt. If a load is added to the stator coil circuit, the current flow will drop and the voltage will start rising and a mechanical load will appear on the rotor. The continued adding of resistance (increased load) to the stator coil circuit until reaching the maximum mechanical load on the rotor is where the voltage and amperage are at their maximum wattage. The continued adding of resistance to the circuit beyond the point of maximum load will cause the voltage to go up and the current to go down, and the load will once again decrease. At the "open" circuit point, maximum voltage potential is produced with no current and no load above the up-front mechanical load. Accordingly, with the electrical machine of the invention, there is almost no mechanical load at maximum current draw when the stator coil is shunted and no load above the up-front load at no current draw (when the circuit is open). It has increasing or decreasing load anywhere in between as determined by the wattage value of the voltage and amperage being produced in the circuit.

Verification of the forward generated EMF in electrical machines in accord with the inventive concept will be appreciated from the following description and FIGS. 12–15. Because the machine of the invention produces a generated EMF during the torque cycles of the machine which is in perfect phase with the applied voltage and current and interacts with the applied current, the high efficiencies achieved by the invention are possible.

The generated current is always in-phase with any voltage and current applied to the machine when it is used as a motor, and any voltage and current source used, such as a power supply or a battery, is seen by the stator coil of the motor as a conducted connection (a dead short). This generated forward EMF flows through the circuit at almost 100% current and not voltage (like shorting out a generator). However, it does not create a load in the presence of the applied current or when the coil is shunted back to itself.

The circuit which is used applies power to the motor only during about 60% or less of each half-cycle (with the center-point triggering depicted), and this power application is at the middle of the forward-generated sine-wave, as shown in FIG. 12. When the circuit is not applying current to the stator coil, it shunts the stator coil to itself so that any generated current from the stator coil can flow back into the stator coil. The result is that the current-flow in the coil is a perfect sine-wave at all times, FIG. 13, when this center-point triggering is used with an ultra-high turn stator coil, even though the applied current is a modified sine-wave with the back and front of each half-wave cut off as in FIG. 14. Accordingly, the current generated from the stator coil supplies the needed current levels to maintain the full current flow in the circuit at all times as shown in FIG. 13. This characteristic was verified by the following test.

Using a modified alternating current which is created with a circuit using a DC source, the turning "off" of one side of the applied sine-wave occurs as shown in FIG. 14. This was accomplished by placing a switch in the triggering circuit for one direction of the circuit. When the applied current is not being triggered, the circuit is designed to shunt the stator coil to itself allowing any generated current to flow in the stator coil as totally shunted current. With this circuit switch "off" and the triggering taking place for only one-half of the sine-wave of the applied current to the motor, the applied current flow is shown in FIG. 14, while the current flow in the coil at all times is shown in FIG. 15. It will be noted that the current flow in the coil never changes (it is the same as FIG. 13). It remains the same even though there is no applied current to that part of the cycle. The motor does slow down slightly under these conditions because the torque which is created in that half of the cycle by the interaction of this generated current with the applied voltage is now missing. However, the current flow in that part of the cycle remains constant and at the same level which confirms that the forward generated EMF is primarily responsible for the current flow in the high-turn-coil and determines the amount of current flow by creating a resistance-less path through the stator coil's various reluctances.

Triggering and Wave Form Characteristics

The circuit which is used with the motor of the invention is designed to apply periodic voltage to the stator coil as triggered AC square waves with trailing voids. During these voids, the period when no voltage is being applied, the stator coil is shunted back to itself allowing the collapsing or expanding fields to generate a forward EMF within the stator coil which fills the trailing void with current with respect to the amperage wave. When the motor is under heavy load, it generates a forward EMF behind the applied current wave which extends the torque farther into the mechanical torque area. When under a light load, it generates a preparatory wave ahead of the next part of the cycle which cancels the effect of inductance on the applied current up to value of its generation. Both cases (heavy load and light load) result in a forward EMF on the stator coil in this part of the cycle rather than a counter EMF.

The timing of the circuit to the stator coil is determined by (1) the position of the mechanical torque "sweet spot" (where the torque is most efficient and strongest), (2) the inner action of the coil with the stator magnets (induced generation due to permanent magnet and stator coil flux series-ing), (3) the shunting effect of the rotors on the stator magnet poles which in turn generate on the stator coil (mechanical generation), and (4) the number of turns on the coil.

The mechanical torque sweet spot is a constant and does not change. It is the nature of the motor of the invention that the motor creates torque by attracting a rotor shunt from the center of one pole to the center of another adjacent pole by means of flux concentration achieved by the interaction of the stator coil flux and the permanent magnet flux. It will therefore be apparent that the torque is created from the center of one pole magnet to the center of its adjacent pole. The so-called "sweet spot" is slightly smaller than this and is positioned in the middle of this torque area where the re-orientation of the laminated rotor pole becomes primarily complete (to cause it to have unhindered attraction to the adjacent magnet pole) but the rotor position is such that the unalignment with the adjacent magnet pole to which the rotor shunt has been oriented is greatest. This, of course, begins with the first position at which the rotor shunt exhibits new complete re-orientation from the first magnet pole to the adjacent pole, since this would be the point of greatest unalignment during this state. A condition of the mechanical torque sweet spot takes place about $\frac{1}{8}$ into the total torque from center to center of each pole and lasts until $\frac{7}{8}$ into this torque area. FIG. 23 illustrates the location of these positions on a four pole stator magnet assembly in relation to the rotor shunts, not shown. The objective is to have the coil current and flux as near as possible to maximum at the beginning of and during the sweet spot effect.

With reference to FIG. 23, assuming that the magnet assembly is rotating in a clockwise direction, the mechanical torque area is from A to B, from B to C, from C to D, and from D to A. In the torque from A to B, the sweet spot is a1 to b1, and in the torque from B to C, the sweet spot is from b2 to c2, etc. The sweet spot is where the torque is most efficient and strongest. At each location indicated above, the rotor shunt is assumed to be centered over the line in question for the description given.

Whenever the motor is under significant load and current is being applied to the stator coil and then it is immediately shunted to itself when the applied current is removed, the flux from the field of the stator coil and the flux from the magnet poles which have been pulled through the coil into series with its flux, try to collapse back through the coil. But since the coil is shunted to itself (dead shorted), the collapsing field generates a forward EMF which extends the current flow in the stator coil and resists the flux collapsing. This momentarily keeps the flux relationship between the stator coil and the permanent magnet poles, which are causing the present torque on the rotor shunt, in place to do continued work on the rotor even though there is no power being applied to the stator coil. Because of the shift in the counter-generation which takes place when the coil is shunted to itself, there is no counter-generation when this forward EMF shunted phase begins, allowing the EMF to flow at its maximum potential initially. The movement of the rotor shunt into the center of the pole also helps keep this flux configuration in place. Depending on how large the current is, which will be determined by how much current is put into the stator coil during the applied current phase, if the motor is under little load, the current will be smaller and therefore the forward EMF trailing the applied current wave will be small and will have little current in it and will extend the work time of the torquing flux only a small degree. In this case, the movement of the rotor shunts from between the pole faces to the center of the destination pole face, will cause the field to keep flowering and thus generate during the trailing void a preparatory current in the opposite direction (without causing any load) which establishes the current flow ahead of the applied wave for the next cycle, FIG. 24.

However, if the motor is under significant load, and thus greater current is present in the stator coil, FIG. 25, the expansion of the flux through the coil by the in-line poles is more quickly completed and thus, when the current turns "Off", the coil and the magnet poles begin to collapse back to the level of flowering which the rotor shunt can maintain. This results in the forward EMF which trails the applied wave becoming larger and larger due to the increased amperage in the applied wave and these collapsing fields. The result is that it lengthens out into the shunted part of the cycle increasingly as greater load is applied to the motor. As a result, this lagging (sustaining) of the applied field increases the work done after the applied power is turned "off" and it does so in the very best part of the sweet spot rotation of the shunt. Unless under a very great load, when the forward EMF is spent, the coil is without applied current as yet. The moving of the rotor shunt more fully into the center of the destination magnet pole face results in a small reflowering of the field. This will generate the small preparatory wave as illustrated in FIG. 25. Because the forward EMF causes the magnet flux to collapse later and later into this shunted cycle, the rotor shunt moves more into place to sustain the flux in an in-line expanded state. This means this flux will collapse but little until the stator coil reverses itself and puts flux through the opposite magnet poles. At that time, it will collapse as the opposite poles expand (flower) outward as represented in FIG. 25.

This shift between the shunted forward generated current (preparatory current) and the shunted forward EMF is actually beneficial to the motor. As can be seen in FIG. 24, the preparatory current lies outside the torque area A/B or B/C (or inside the previous torque area) when the motor is not under load and while it is beneficial to establish current ahead of the applied wave, which overcomes the inductance, it does not create torque output. As will be noted, the shift of this shunted current to following the applied current puts this power in the torque sweet spot (a1–b1, b2–c2) which increases the power output as this forward EMF current extends the applied current and keeps the established flux in place to do work. Since the forward EMF current is not input power (because there is not applied voltage or amperage during this time), and it is capable of maintaining the torque, this is why the applied current is turned "off" in the middle of the torque sweet spot and the shunting of the stator coil is allowed to extend the output by resisting the collapse of the flux causing the torque on the motor.

Therefore, it is to be appreciated that the circuit used with the motor of the invention applies a triggered periodic alternating current wave to the stator coil and uses a shunting circuit which makes it possible to shunt out the stator coil between applied waves without shorting out the applied current.

Figure 30:
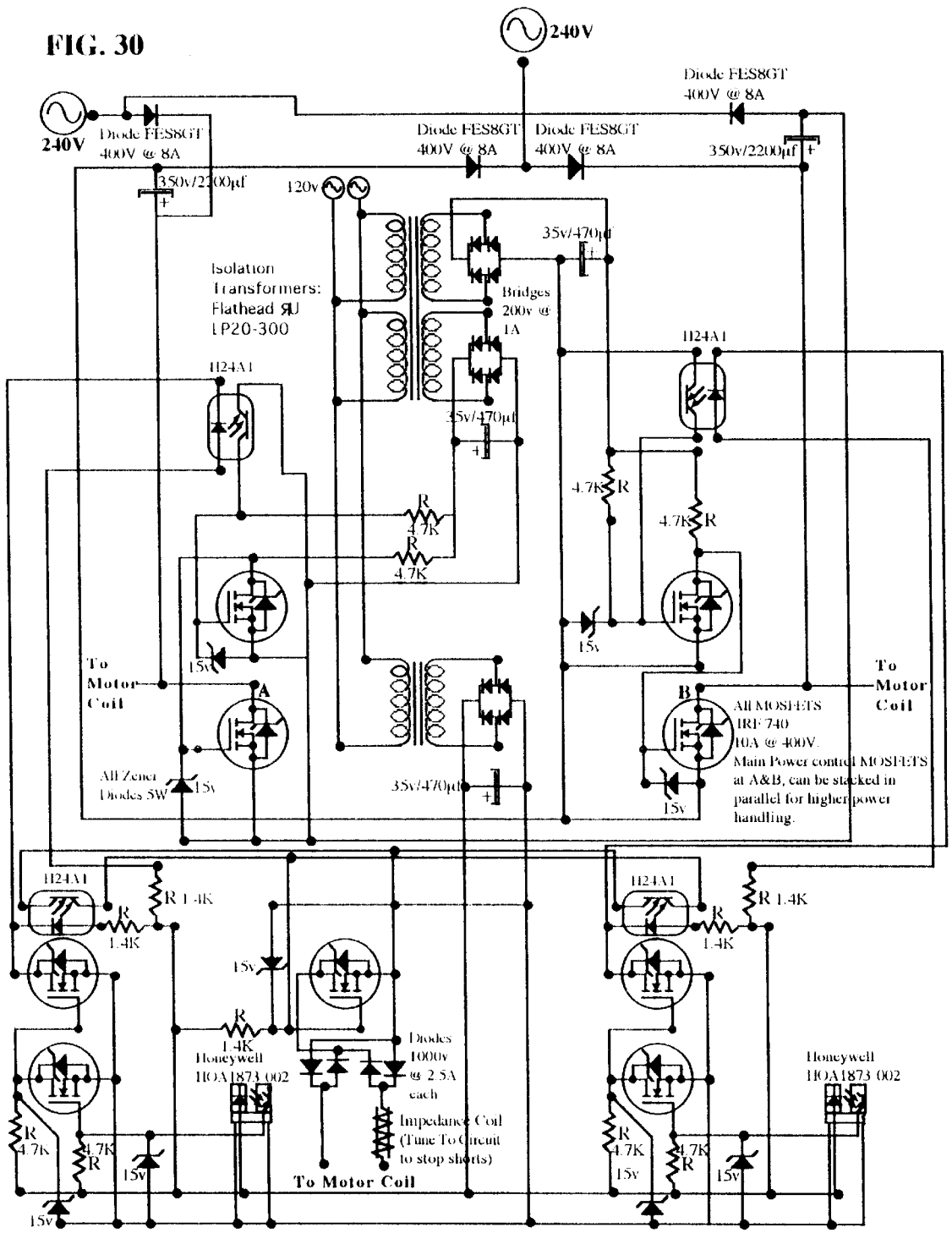
FIG. 30 is a circuit diagram of the motor of the invention with off-cycle shunting of the stator coil.

A run circuit for the motor of the invention with off-cycle shunting of the stator coil is shown in FIG. 30.

Triggering and operation of the stator coil through the circuit shown in FIG. 30 is accomplished by switching means mounted upon the motor drive shaft 20.

While it is to be appreciated that switching of the stator coil circuit may be accomplished by a variety of switching systems using Hall effects, commutators, or the like, preferred switching is accomplished through the use of a slotted optical switch 98, FIG. 27, such as manufactured by Honeywell, Model HOA1873-002. This switch is represented in the circuit on FIG. 30.

In FIG. 27, control of this switch 98 is by means of a timing disk 100 mounted upon the motor shaft for rotation therewith. A typical timing disk as used with a four pole stator magnet assembly 34 is shown in FIG. 26. With reference to FIG. 26, the timing disk 100 includes a central opening 102 permitting the disk to be mounted on the motor drive shaft 20, and the timing disk includes opaque portions 104 diametrically opposed to each other so as to define windows 106. In the illustrated embodiment, the rotational extent of the timing disk portions 104 is 90°, and the rotational extent of the windows 106 is 90°. However, to produce optimum stator control for a particular mechanical motor torque requirement, the rotational extent of the windows 106 may be reduced from 90°, which is very easy to do with the type of timing disk disclosed.

In the known manner, the timing disk 100 rotates between the emitter and detector of the slotted optical switch 98, FIG. 27. Two optical switches 98 are utilized with a four pole stator magnet assembly, and the switches will be disposed at right angles to each other as schematically illustrated in FIG. 27.

If an eight pole stator magnet assembly is used with the motor of the invention, a timing disk 108, FIG. 28, is shown wherein four opaque projections 110 are defined on the timing disk which in turn define four windows 112 diametrically opposed to each other. In such instance, the timing switches 98 are located at 45° relative to each other as schematically represented in FIG. 29.

Stern-point and Center Point Triggering

Previously, the general triggering and wave form characteristics utilized by the motor of the invention have been discussed. In this section, a more detailed discussion is presented with respect to the timing of the triggering of the stator coil. The two ways that have been best determined to trigger the motor of the invention are hereinafter called stern-point triggering and center-point triggering. This terminology is used to indicate where the triggering of the stator circuit occurs in relation to the forward generated wave of the motor. Stern-point triggering occurs in the back half of the generated wave, and this type of triggering has proven to be the most efficient under most conditions and can be used with both high-turn and low-turn stator coil motors. Center-point triggering occurs in the middle of the generated wave, and this type of triggering is normally used only with a stator coil having a high number of turns.

Stern Point Triggering Timing

Figure 31:
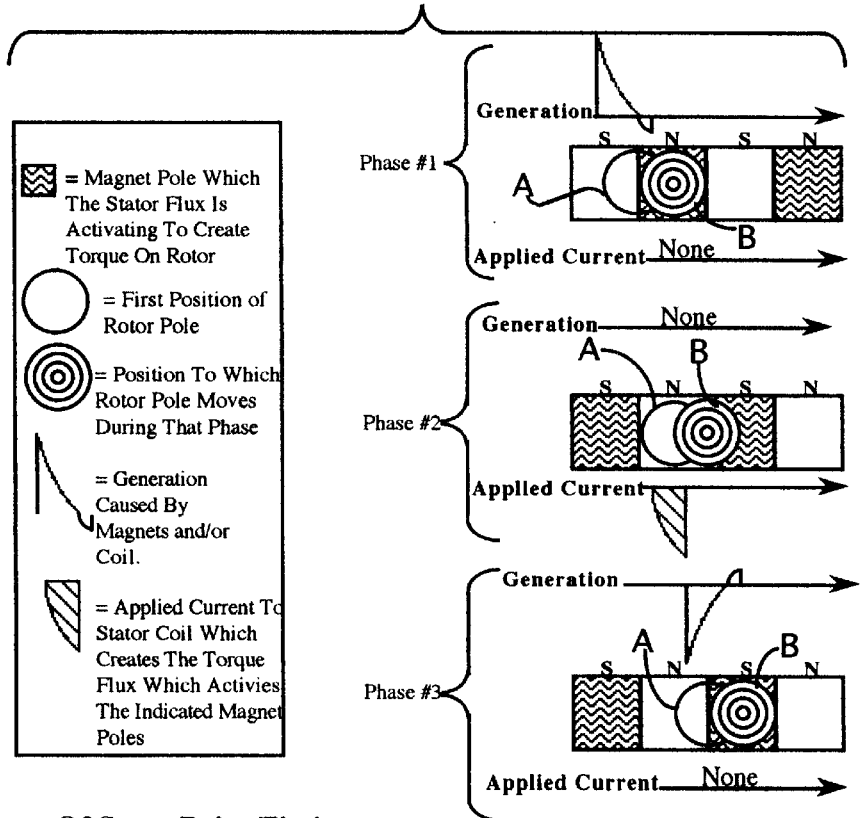
FIG. 31 is a schematic illustration showing the three phases of relationship between the rotor magnets and rotor pole shunts when using stern-point timing.

Stern-point triggering is explained below with respect to FIGS. 31 AND 32. In FIG. 31, a four magnet assembly which, of course, is in the form of a disk, is schematically represented in a linear manner for purpose of illustration, the poles being represented by the letters "N" and "S". The magnet pole which the stator flux is activating to create torque on the rotor is shaded in FIG. 31. The first position of the rotor pole or shunt is indicated at A, and the position to which the rotor pole or shunt moves during a particular phase is represented by the darker circle B. During each phase of operation, generation and applied current values are indicated, the generation representation is caused by magnets and/or the coil, while the applied current indication is that applied current to the stator coil which creates the torque flux which activates the indicated magnet poles.

In FIG. 31, the three phases of stern-point timing are illustrated and indicated as Phase numbers 1, 2 and 3. It will be appreciated that in each phase, only one rotor pole is schematically illustrated for purpose of illustration and clarity.

In Phase #1, there is generation on the stator coil due to the collapse of the coils' field (forward EMF) from previously activating the north magnetic poles. This results in the flux in these north poles being lagged or delayed from collapsing and they continue to create torque on the rotor shunt. When the forward EMF is depleted, the rotor shunt is nearly centered on a north face. At this point, the north pole's flux is no longer kept flowered by the stator coil as the coil has no more forward EMF, but because the rotor shunt is in position to cause in-line shunting and keep the north pole's fields flowered, and because this shunt is moving more fully to the center of the north pole face, the field reflowers somewhat. This small reflowering results in the small generation wave which begins the negative part of the wave. There is no applied current during Phase #1.

In Phase #2, the applied current comes on in the same direction as this small generation and activates the south poles as indicated. This overrides the mechanical shunting (which is attempting to flower the north field) and pulls the flux from the south poles through the stator coil instead. The north poles are caused to fully collapse as the south poles expand through the coil and both of these (the collapsing north and the expanding south) generate the same direction. The rotor shunt begins to be torqued toward the south pole in front of it.

With reference to Phase #3, as the rotor shunt gets to the center point of the mechanical torque (centered between the north and south poles), the applied current is turned "off". The circuit shunts (shorts) the stator coil back to itself and a forward EMF is generated, as the coils' flux tries to collapse, which holds or lags the flux of the coil and south poles in place to continue the torque on the rotor shunts so that it is drawn to the center of the south pole. When the forward EMF is depleted, the rotor shunt is nearly centered on the south faces. At this point, the south poles' flux is no longer kept flowered by the stator coil as the coil has no more forward EMF, but because the rotor shunt is in position to cause in-line shunting and keep the south poles' fields flowered, and because this shunt is moving more fully to the center of the south pole face, the field reflowers somewhat. This small reflowering results in the small generation wave which begins the positive part of the wave. There is no applied current during Phase #3.

After completion of Phase #3, the process repeats itself. The above described stern-point timing applies current to the back part of the forward generated wave in the stator coil. The wave forms shown in FIG. 32 are those seen under load as the forward EMF, after the applied wave, becomes larger and takes over the void which follows the previous wave and proceeds to the next wave. Thus, the established field by the stator coil is lagged and there is not as much forward EMF generated before the next wave. But since the lagged flux is in the "sweet-spot" of the mechanical torque and keeps this torque active even though the power is "off" at this point, it results in greater efficiency in the motor.

Figure 32:
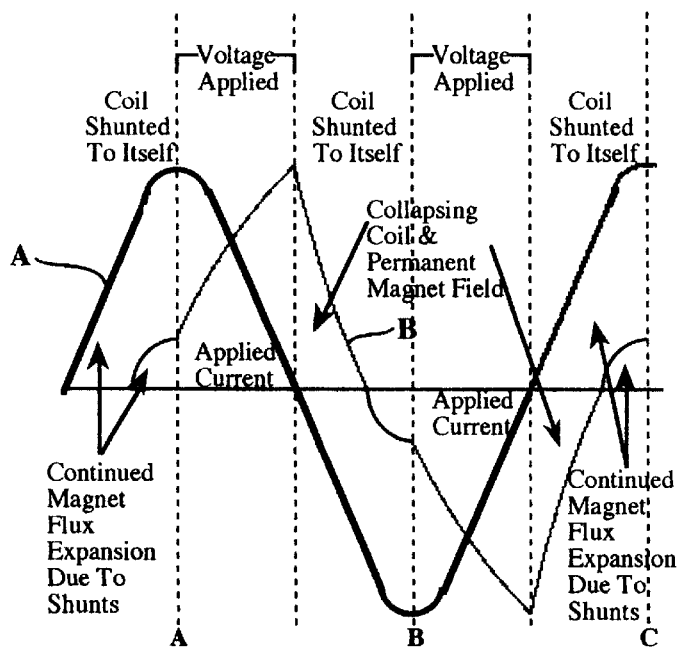
FIG. 32 is a graph illustrating the basic wave forms present during stern-point timing.

FIG. 32 represents the basic wave forms of stern-point timing. The bold line wave A is the wave form when the motor is free running or under light load. The lighter wave B is the wave form when the motor is under heavy load. This graph illustrates the shift which takes place because of the forward EMF which follows the wave under load.

Center-point Timing

Center-point timing of a motor in accord with the invention is explained below and with reference to FIGS. 33 and 34. In this description, the same symbolism is used as employed with respect to the description of FIGS. 31 AND 32, the magnet assemblies being shown in a linear manner, and only one rotor pole or shunt being illustrated.

With center-point timing in Phase #1, there is generation on the stator coil due to the continued expansion of the permanent magnet field which is being induced by the increased centering of the rotor shunt over the north pole. There is no applied current at this point.

In Phase #2, the applied current comes on in the same direction as the previous generation and activates the south poles as indicated. This overrides the mechanical shunting (which is adjacent shunting moving toward flowering the north poles) and pulls the flux from the south poles through the stator coil instead. While the rotor shunt is moving toward the center of the north pole, this stator flux is establishing itself through the south poles. By the time it reaches the center of the north pole, this flux is established and it begins to pull the rotor pole forward to the south pole ahead of it.

In Phase #3, the flux from the stator coil established through the south pole begins pulling the rotor shunt forward until it completes its cycle and then shuts "off".

In Phase #4, illustrated is the completion of the induced generation for this half-wave due to the partial collapse of the south field through the coil and due to the fact that as the applied current is "off" at this point and the stator coil is shunted back to itself (shorted), the forward EMF which is generated from the collapsing field of the coil lags or delays the collapse of the south field and generates the backside of this half-sine-wave as the mechanical adjacent shunting tries to induce the collapse of the south field.

In Phase #5, the forward EMF from the collapsing motor stator has been exhausted and the south field now reflowers through the stator coil and generates the beginning of the negative part of the sine-wave due to the rotor shunt moving to the center of its face (mechanical in-line shunting).

In Phase #6, the applied current comes on in the same direction as the generated EMF which was due to the re-expanding south field and causes the south field to completely collapse to adjacent shunting while the north poles expand through the stator coil to cause continued torque. Thereupon, the cycle repeats itself.

FIG. 34 illustrates the basic wave forms for center-point timing. The bold line wave A is the wave form when the motor is free-running or under load. No other wave form is shown because with high-turn coils, the wave form changes very little under load, and center-point timing is only used with high-turn stator coils.

Motor Characteristics During Stern-point Triggering

Figure 35:
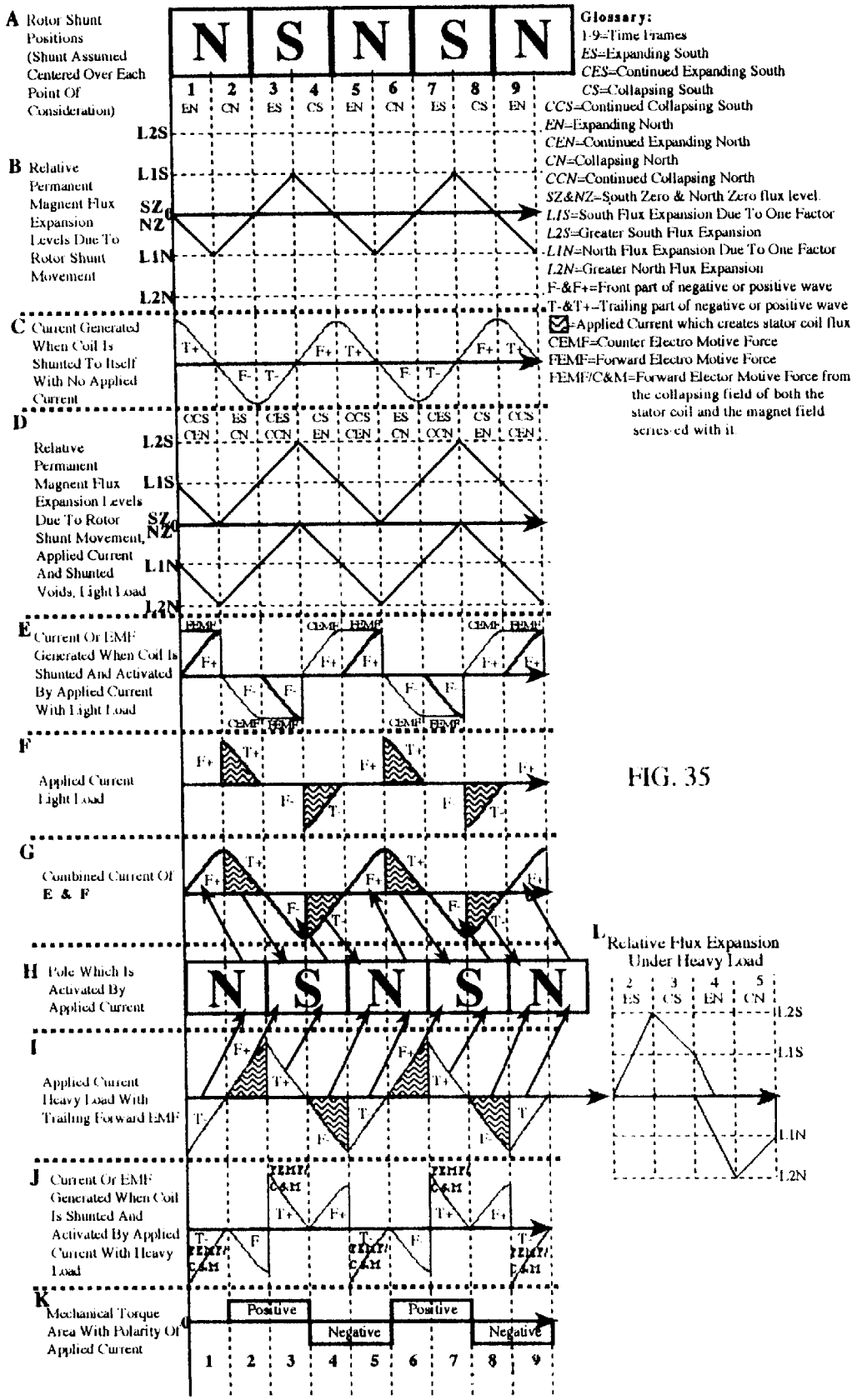
FIG. 35 is a master graph illustrating motor characteristics during stern-point triggering.
Figure 36:
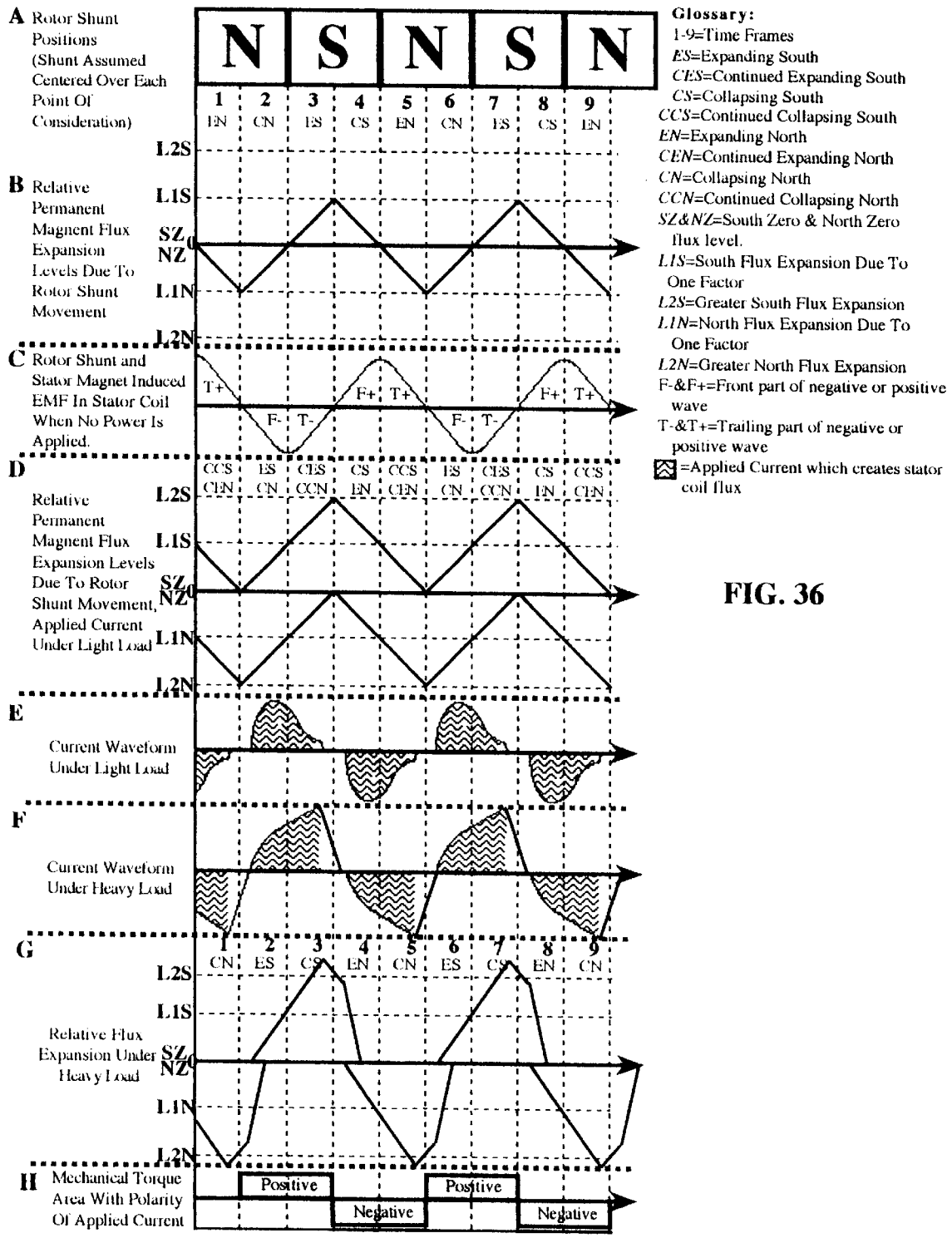
FIG. 36 is a master graph illustrating motor characteristics using a non-shorting circuit shown in FIG. 54 to run the motor which is preferable in certain applications. Instead of the stator coil being shunted back to itself during the no powered part of the cycles, it is allowed to charge a set of capacitors which are the primary power source for the motor.

It is believed that the operation of a flux diode motor in accord with the invention will be best appreciated from the master graph shown in FIG. 35. Legends appear on the graph to clarify represented conditions, it being submitted that by applying the legends on the drawings, a clearer understanding is available than if the legends were incorporated into the specification.

In FIG. 35, the poles of permanent magnets are represented in a linear manner by the letters N and S. Nine rotor shunt positions are illustrated by the vertical dotted lines and are represented as expanding North, collapsing North, expanding South and collapsing South, as indicated.

In Section A of FIG. 35, rotor shunt positions are illustrated wherein the shunt is assumed to be centered over each point of consideration. Sections A through C illustrate different aspects as to what is happening in the machine of the invention when the invention is being rotated as a generator and the stator coil is shunted (shorted) to itself. In A, the poles of the magnets in the stator are shown so that the flux expansion and collapse and current waves can be coordinated with the permanent magnet poles which are causing the effect. The laminated rotor shunts are not shown, but are always understood to be centered over the time frame and also that part of any particular time frame under consideration. In A, the time frames, delineated by the vertical dashed lines, are numbered 1–9.

In Section B, the flux expansion and collapse caused by the laminated rotor shunts through alternating adjacent and in-line shunting of the magnet poles is shown. L1S and L1N is the first level of flux expansion due to the rotor shunts alone. L2S and L2N represent higher levels of flux expansion which are reached either by the effect of the stator coil on the magnet poles or, by combination of the stator coil and rotor shunts. If the stator coil and rotor shunts enhance each other, it will take the flux to a higher level represented by L2S and L2N. If they are non-enhancing or even conflicting, it will result in less flux expansion or collapse usually represented by L1S or L1N. Complete collapse of a magnet pole so that it does not cut the turns of the stator coil at all is represented by SZ and NZ, which means zero flux expansion.

Also in B, just under the time frame numbers, are symbols which denote which field, North or South, is expanding or collapsing and how. The zero line arrow in each indicates the direction the time frames are moving from left to right.

Section C shows the sine-wave current generation of the stator coil when shunted (shorted) to itself. By observing the time frames and the magnet poles and at which flux is expanding and collapsing, it is possible to determine what is causing the generation at any given point in time. For instance, comparison of Section C with Section K, which is the torque graph showing where the torque occurs and indicates either positive or negative current to cause the torque, it will be appreciated that the generation of the motor under these conditions is always a counter EMF in relation to the applied current needed to cause torque. However, this changes when the stator coil applies a quasi-sine voltage wave (with a trailing void) and its resulting current to the magnets and rotors.

In Section D, the flux expansion and collapse through the stator coil will be apparent as the motor is running under light load. During light load running, the North and South flux expansion and collapse overlaps and one builds, while the other expands and vis-a-vis.

In Sections E and F, the applied current and the current or EMF generated at the same time (E) in this light load state. It will be noted in F, frame 2, that a T+ wave is applied which causes the South field to expand and the North field (already expanded) to start to collapse. Since an expanding South and a collapsing North will generate the same direction on the stator coil, they work in sync to create a counter EMF during the 2 time frame which is seen in E, where we have an F− wave or EMF being generated which is driving the applied current downwardly. In F, frame 3, the applied current is turned "off", and a unique occurrence results. Instead of the South flux beginning to collapse and the North flux leveling off, because the laminated rotor shunts are moving from between the North and South pole faces (see Section A) to the middle of the South pole face (which induces mechanical in-line shunting of all of the in-phase South poles) and because the stator coil is shunting to itself, the South pole flux continues to expand upward through the stator coil. Because the rotor shunt is also, at the same time, being pulled more fully out of alignment with the North pole face, the North pole flux continues to collapse. This continued expanding South and collapsing North generate a continuing F− EMF (E,3) which, because the stator coil is shunted to itself, generates an F− current wave in the stator coil. The combined wave form is shown in time frames 2 and 3 in Section G. As a result of this F− wave, current is established in the stator coil in the very direction in which the next applied current wave is to be applied. Thus, this current acts as a forward electromotive force preparing for the next applied wave and acting on it and causing it to go immediately to the amplitude of its peak. This means that the applied current has no rise slope to it and thus the current in the stator coil at the beginning of time frame 4 is established instantaneously without any inductance effect. This means that the motor of the invention will be very voltage efficient under light load and will need little voltage to establish useful current and flux in the motor.

Section H illustrates which magnet poles are being excited and expanded by the various applied current waves in the stator coil. The graph of this section makes it possible to see how the torque leads the shunts and how the generated EMFs in the coil are shifted forward. Section H is interrelated to Sections G and I, with arrows, for this reason.

In Section I, it is shown how the stator coil, magnets, laminated rotor shunts, applied current and the circuit interact under load. It will be noted that the wave form is very different. This is due to the forward electromotive force which is filling the trailing void after the applied current. In time frame 2 of Section I, it will be noted that the applied current is an F+. At the same time frame in Section J, it will be seen that the expansion of the South flux through the stator coil as a result of this applied flux generates an F− as a counter EMF. Also, by looking at Section L, which is the flux graph which correlates with Sections I and J, it will be appreciated that the expansion of the South pole flux is to L2S. In time frame 3, the applied current is turned "off" and the circuit shunts the stator coil back to itself. Because the current in the coil is at its peak, there is a large forward electromotive force which is generated by the collapsing field of the stator coil and this is also reinforced by the collapsing of the flux from the South pole of the magnet. At the same time, the laminated rotor shunt is moving into the center of the South face, which is setting up mechanical in-line shunting (which the stator coil has already established). The resistance of the stator coil to the collapsing flux of both the coil and the magnet keeps the flux in place to continue to create torque on the rotor shunts. As the rotor shunt moves onto the face of the South pole, it will not allow the flux to collapse beyond L1S, as can be seen in Section L, time frame 2. This results in much increase in output at the shaft of the motor as this torque takes place in the mechanical "sweet spot" as can be seen by looking at Section K of the graph, and the overall time of torque now completely fills the torque area. Also, it will be noted that, under light load, the applied wave was at zero when the current was turned "off" (Section G, time frame 2) and, thus, there was no forward EMF to fill the trailing void after the applied wave, and since the rotor shunt caused the excited pole to expand even further, this trailing void created a preparatory forward current EMF for the next applied wave. This caused some torque because as the rotor shunt was pulled in front of the excited pole, it at the same time generated a field which enhanced the poles excitation. But the collapsing EMF of both the stator coil and the magnet pole when under heavy load increases the torque much more during this part of the cycle than did the other configuration under light load. The forward preparatory current is not generated for the next applied current wave under heavy load, but the increase of torque output by the forward EMF during the same time frame (3) greatly increases the output of the motor. It is to be noted that this all happens in time frame 3, without any further input to the motor and thus keeps the output efficiency very high as related to the input.

Also, it is to be noted that during time frame 3, when the forward EMF is working, there is no counter EMF. This allows the full potential of the various torque factors to be realized without resistance from within the motor system.

The graph shown in FIG. 35 illustrates how the motor of the invention, when running under light or heavy load, has a forward EMF part of the time. When under light load, this is seen in the preparatory wave which makes it possible to take the coil current and flux to full potential instantaneously without any inductance slope upon the application of current. When under heavy load, this is seen when the forward EMF filling the trailing void (after the applied current wave) is able to do work without any counter EMF acting on it at all. This results in continued high torque output even though the input has been turned "off" at this point.

Magnet Rotor Version of the Flux Diode Motor

Figure 37:
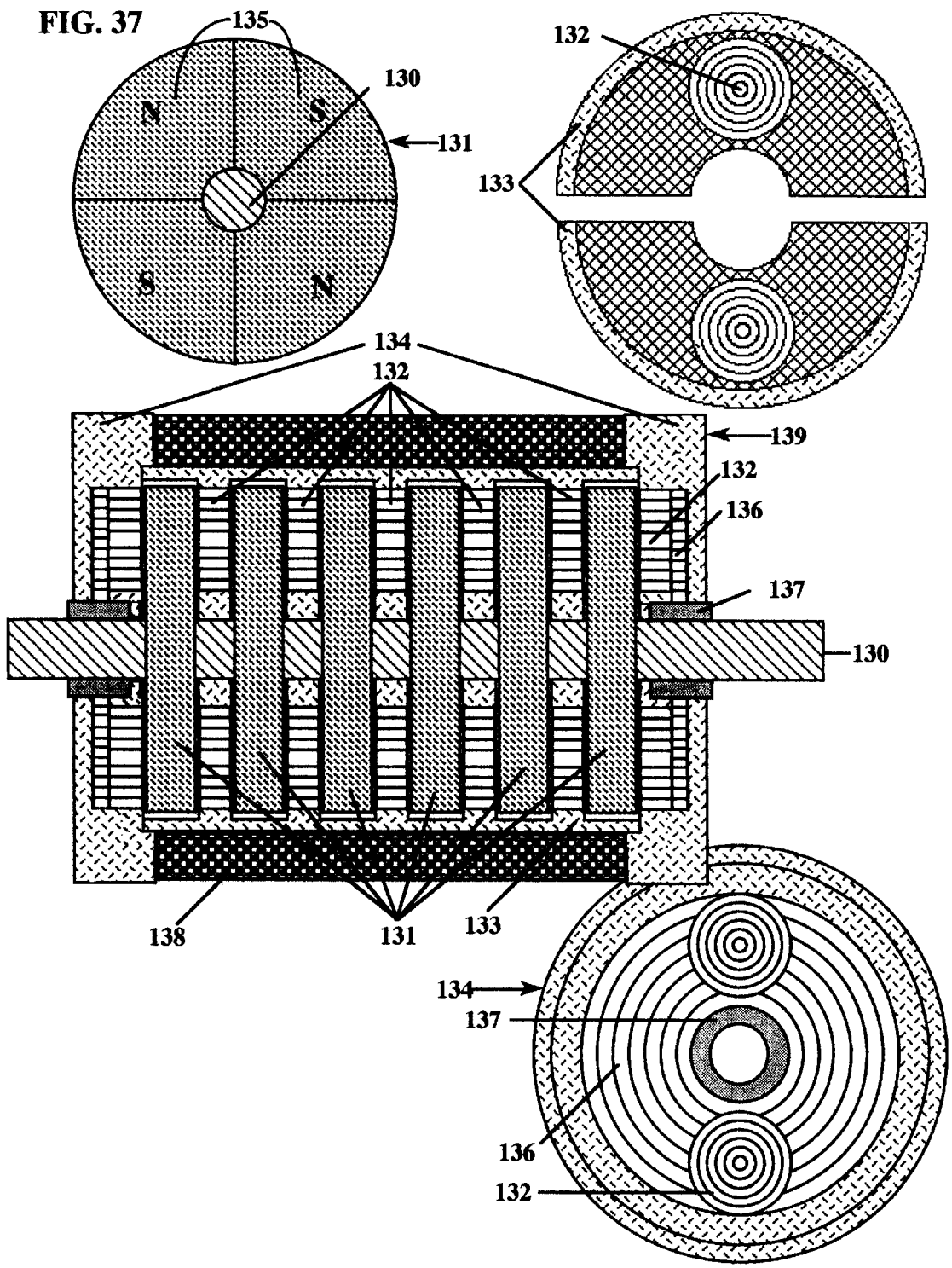
FIG. 37 is an exploded four view section of another embodiment of the motor of the invention wherein the magnets rotate and the shunts are stationary.

FIG. 37 shows a version of the flux diode motor where the magnets rotate and the shunts are stationary. Each rotor is made of a single magnet 131 with multiple poles 135, and affixed to shaft 130. Motor and stator housing 133 is in two parts which snap together making it possible for the motor and stator housing to surround and hold, by means of non-friction bearings 137, the rotor assembly. Laminated stator shunts 132 are affixed within holes in the motor and stator housing 133. Motor end plates 134 have laminated flux collector rings 136 affixed to them and laminated stator shunts 132 affixed to the collector ring 136. Also bearing 137 is mounted in end plate 134. Motor 139 illustrates the assembled motor with coil 138 wrapped around its motor housing 133 with end plates 134 also serving as motor coil retainers.

When coil 138 is excited by either an electronically commutated AC current, or standard AC wall current, the laminated stator shunts 132 serve as a series of spaced coil cores to direct the flux which is collected by the two flux collects 136. As the current applied to the coil goes positive, the flux passes through the center of the coil 138 in one direction and is concentrated in the stator shunts 132. The magnet rotors 131 have two poles each 135 which are magnetically out-of-phase with the coil flux and will not let it pass and also two poles 135 which are magnetically in-phase with the stator coil flux and actually conducts it. This results in the rotors 131 torquing to bring into alignment the in-phase poles 135 with the laminated stator shunts 132 where the flux of coil 138 is being directed. Then as the current goes negative in stator coil 138, the flux is reversed in the stator shunts 132. The magnet poles 135 of rotor 131 which were torqued into alignment with the laminated stator shunts 132 are now magnetically out-of-phase with the flux of coil 138 which has reversed and is passing through the laminated stator shunts. Now the opposite set of magnet poles 135, which are not in mechanical alignment with stator shunts 132, are magnetically in-phase with the flux of stator coil 138 passing through the laminated stator shunts 132. The stator coil flux passes through these magnetically in-phase poles of rotors 131 and at the same time causes a torque on the rotors 131 to bring the in-phase magnet poles 135 into alignment with the laminated stator shunts 132. This sequence is then repeated.

Figure 47:
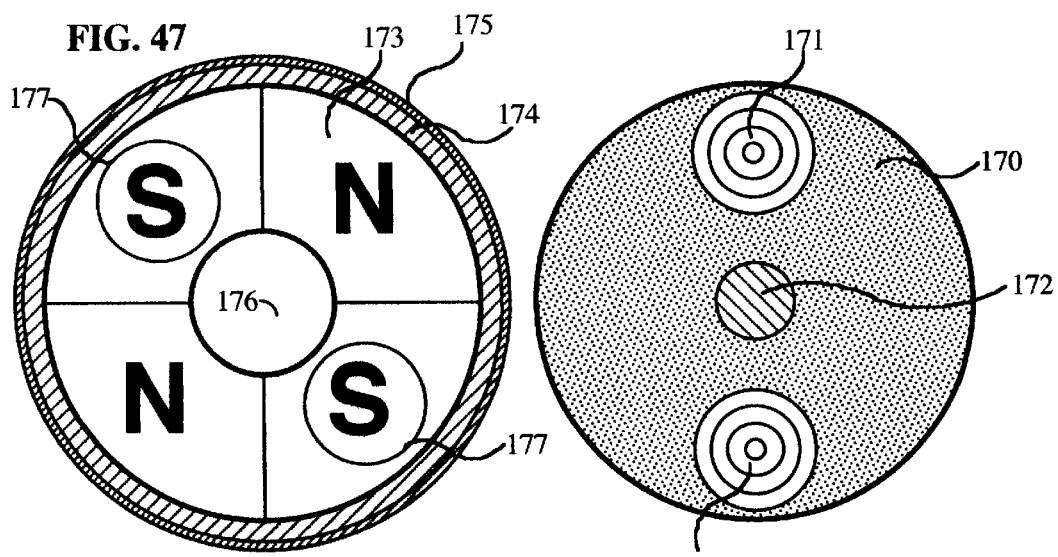
FIG. 47 is a two-part figure illustrating relative size ratios preferred when using a motor in accord with the invention with 120 volt alternating current.

If the motor is designed to run on standard sine-wave wall current, then the size ratios indicated in FIG. 47 must be followed. If it is to be electronically commutated, then the sizing can be as illustrated in other parts of this disclosure. The high power density versions illustrated in FIGS. 38–41 can also be reversed to magnet rotor versions as illustrated here.

High Power Density Version of the Flux Diode Motor

Figure 38:
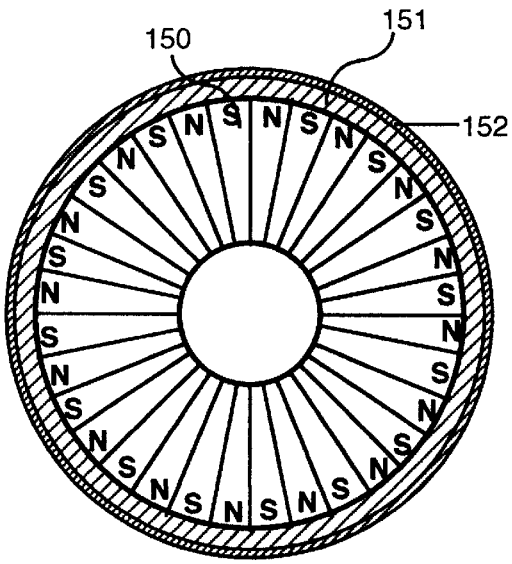
FIGS. 38, 39 and 40 show components of another embodiment of the invention having a high power density.
Figure 39:
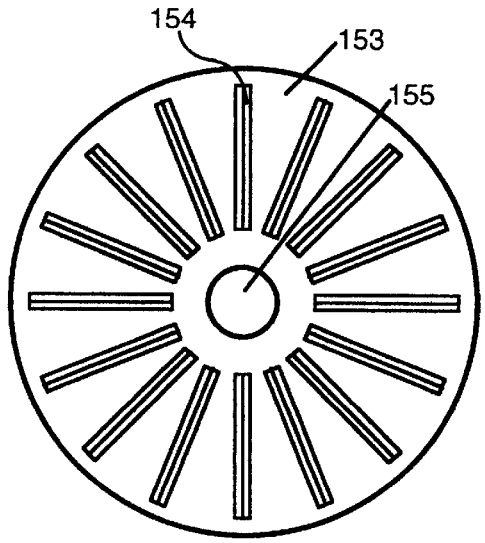
Figure 40:
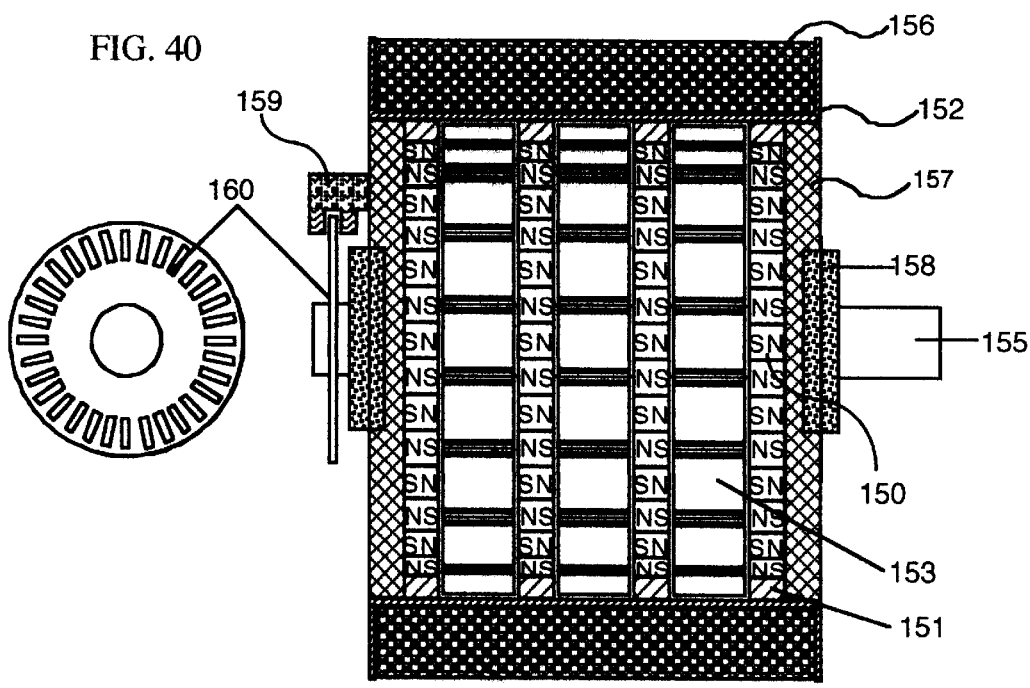

In FIGS. 38–40, a high power density version (high power to size ratio) of the flux diode motor is illustrated. In FIG. 38, magnet 150 has 32 multiple poles on each face. Magnet 150 is held by spacer 151 which is held by motor housing 152. FIG. 39 illustrates a 16 laminated pole rotor 153 with laminated poles 154 affixed to shaft 155. FIG. 40 illustrates the assembled motor with end plates 157 holding bearing 158 and affixed to motor housing 152, which has a coil retainer in which stator coil 156 is wrapped around the circumference of the motor. Rotors 153 are axially spaced along shaft 155 so as to rotate freely between magnets 153. Trigger 159 is positioned so that it properly interacts with timing windows disk 160 which is affixed to the end of shaft 155.

The rotor shunts 154 which are laminated along the radii of the rotor 153 are slightly smaller in width and length than the faces of the magnet poles of magnet 150. This causes them to be biased to sitting at the center of a magnet pole and not across two poles.

Figure 54:
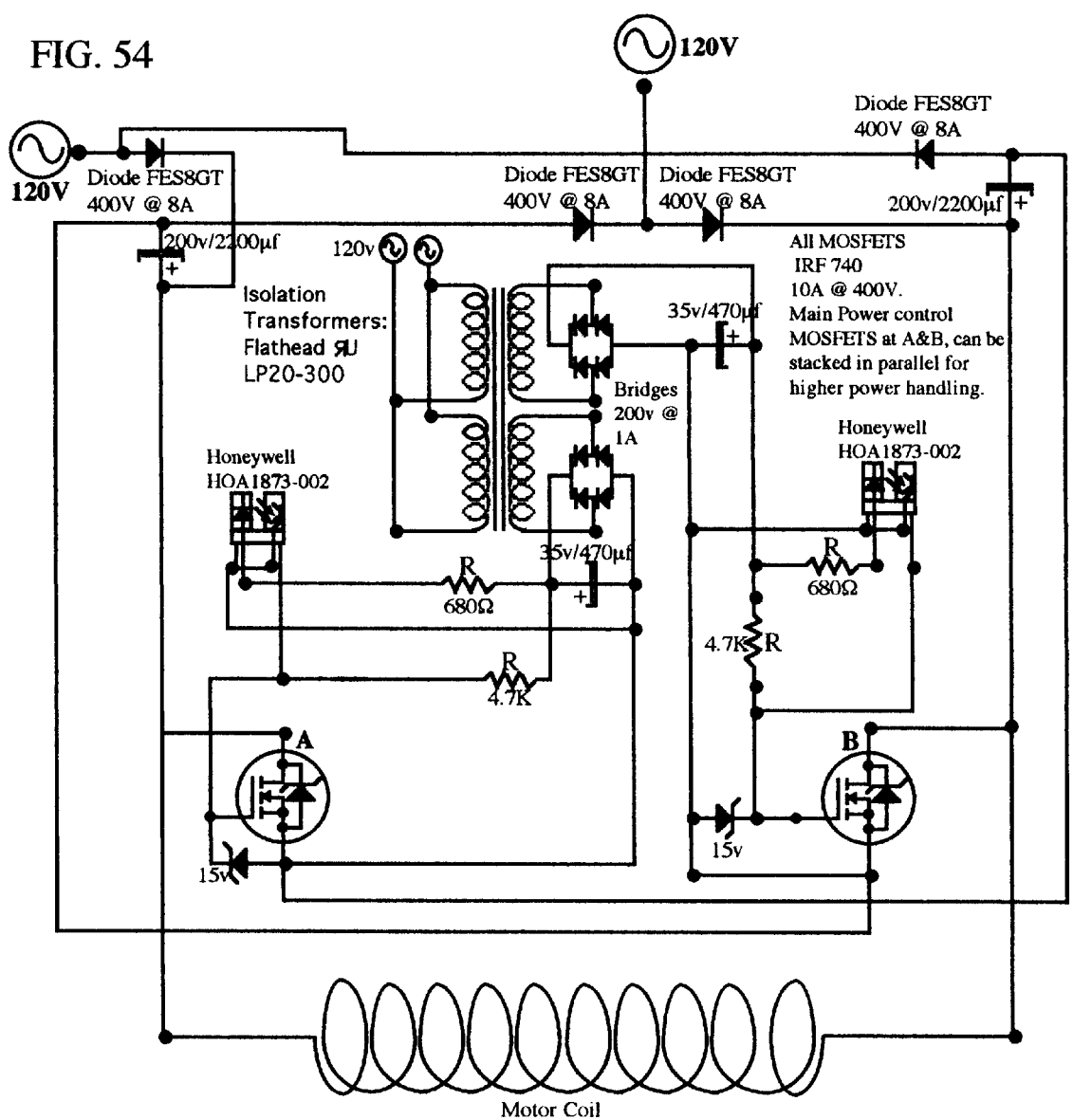
FIG. 54 illustrates a 120 volt circuit which may be used with the motor of the invention, such as that shown in FIG. 36.

This version of the flux diode motor can be run using either the circuit in FIG. 54 or FIG. 30. Because the stator coil in the flux diode motor configuration tends to respond to applied voltage and current like a free air coil, due to its already saturated core, it is very efficient at high frequencies. This makes it possible to use this very intense pole design and still run at very high RPMs. The result is that the torque is greatly increased because the torque-bar is increased and the torque also takes place over a much smaller air gap with the nearness of each magnet pole to its adjacent pole. Thus high horse power to size ratio is the result and also high efficiency is retained as the torque increase and RPM retention do not cause a major change in frequency inductance when used in the flux diode configuration.

Figure 41:
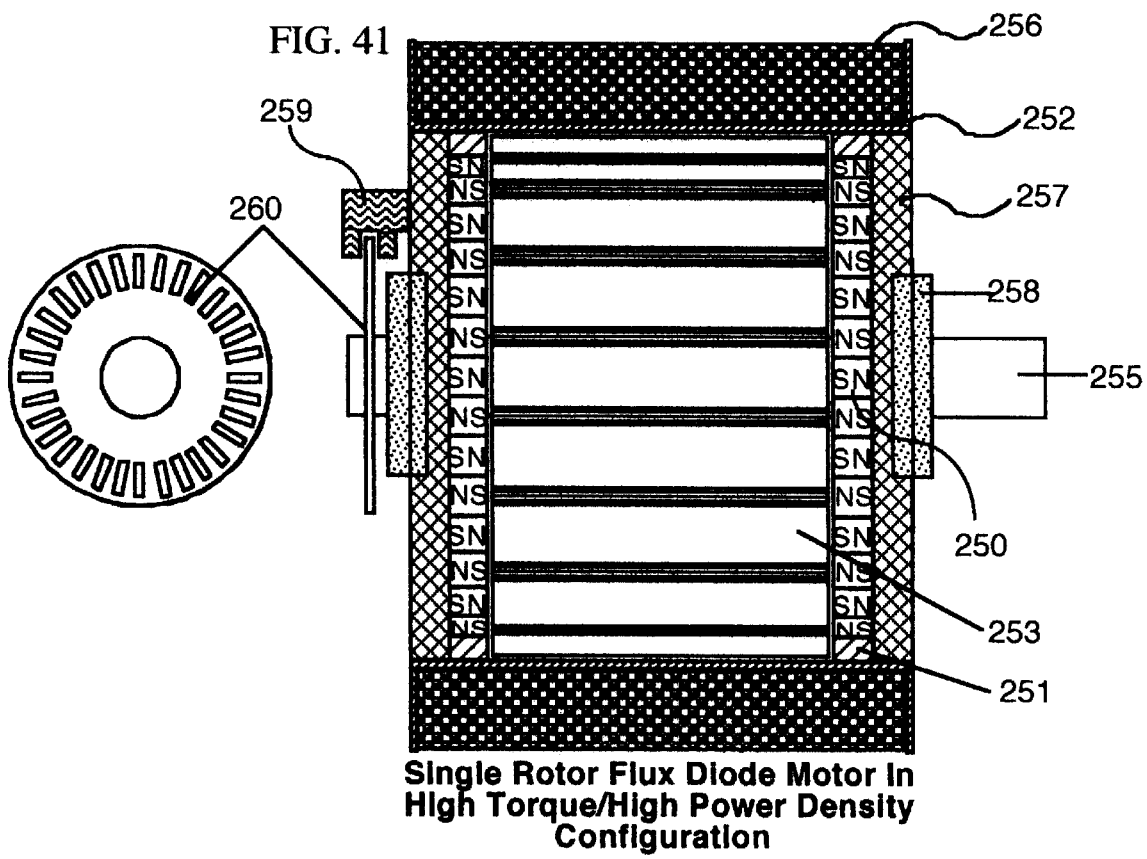
FIG. 41 is a single rotor embodiment of a high power density motor using the inventive principles having an elongated rotor.
Figure 42:
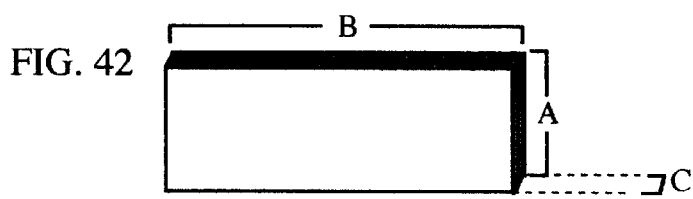
FIG. 42 illustrates the elongated shunts utilized in the motor embodiment of FIG. 41, FIG. 43 also illustrates an elongated laminated shunt as used with the motor of FIG. 41, FIGS. 44, 45 and 46 illustrate a direct current (DC) version of an embodiment of the motor of the invention.
Figure 43:
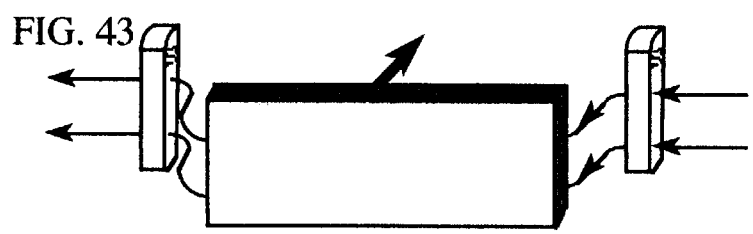

In FIG. 41, a single rotor version of the high power density design is illustrated. The only difference from the motor illustrated in FIG. 40 is that the flux diode stator magnet assemblies 250 are reduced to two at each end and a single, longer rotor 253 is placed between them. In FIGS. 42 and 43, the laminated shunts in rotor 253 are illustrated for purpose of understanding how the high torque is achieved even though smaller amounts of metal are used than in most motors.

As can be seen in FIG. 42, height A and length B compose the torque bar of the flux diode configuration. Width C is not as critical as long as it does not become wider than the magnet poles of the stator assembly with which it is used. A single lamination in width, C, (for example: 0.014" thick) will sometimes give 85% of the same torque as ten (10) of the same laminations stacked together at C, as illustrated. This is because, as depicted in FIG. 43, the flux going through the stator shunts interacts most with the leading edge of length A (FIG. 42) and along the length of B. By testing, the minimum amount of metal for the maximum amount of torque can be achieved, thus bring the efficiency of the stator coil to maximum by reducing the amount of metal to be saturated.

True DC Version of the Flux Diode Motor

Figure 44:
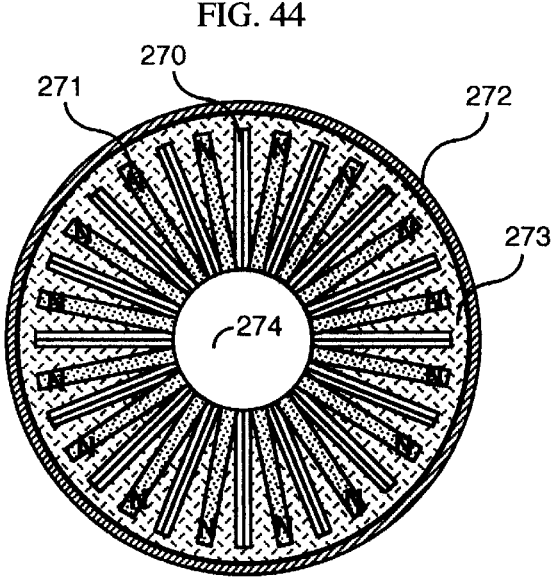
FIG. 44 illustrates a stator assembly.
Figure 45:
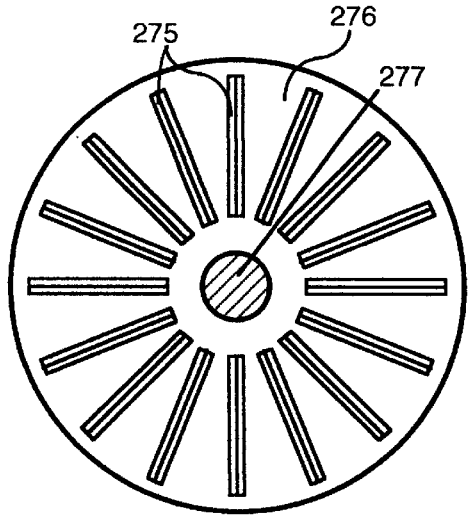
FIG. 45 illustrates the rotor.
Figure 46:
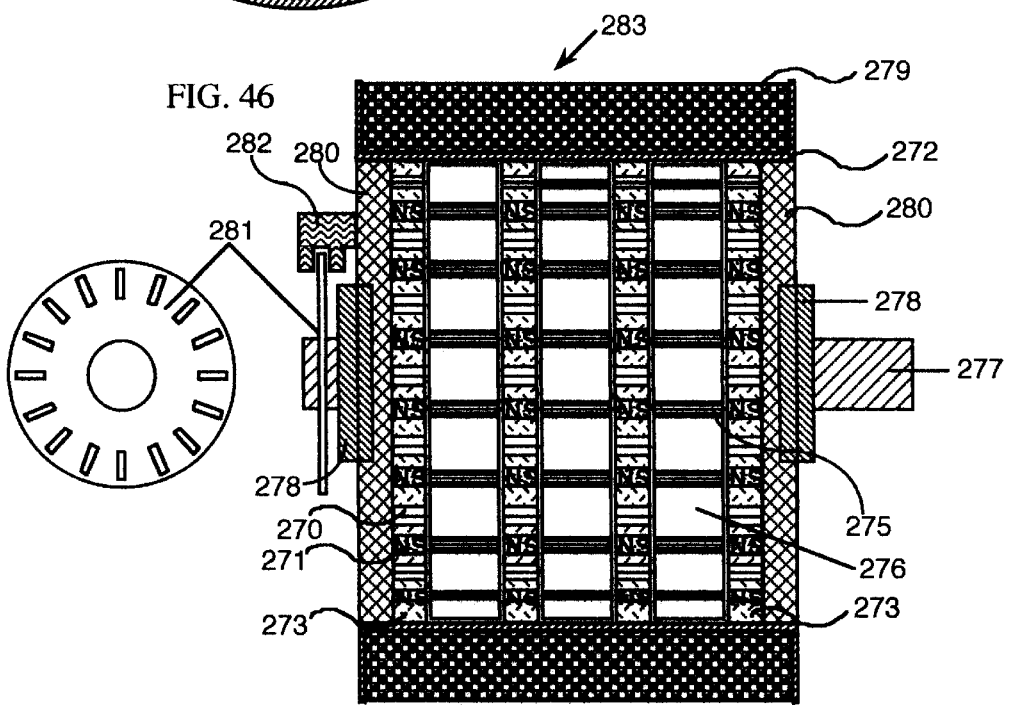
FIG. 46 illustrates the assembled DC motor.

In FIGS. 44–46, a DC version of the flux diode motor is illustrated. This is called a "true DC motor" because there are no reversing voltages or currents applied to the stator coil by means of a commutator of any other device or circuit. The stator coil only has current applied to it as a triggered DC pulse.

As can be seen in FIG. 44, the stator assembly 273 is composed of magnets 271 which all have the same polarity and are spaced equally around the radii with laminated shunts 270, which have the same face size as magnets 271, placed between each magnet 271. The magnets and shunts are spaced equal distances apart at their outside circumference and are positioned to fit tightly together at the inside circumference around shaft relief opening 274. The stator assembly is held inside motor housing 272.

This alternating pattern of magnet and laminated shunt forms the basis of the flux diode true DC stator. Rotor 276, in FIG. 45, which has the same number of laminated shunts 275 but none of the magnets, is affixed to shaft 277. The spacing of the laminated shunts is such that they will align with either the magnets of stator assembly 273, or with the stator laminated shunts depending on the position of rotation.

Figure 55:
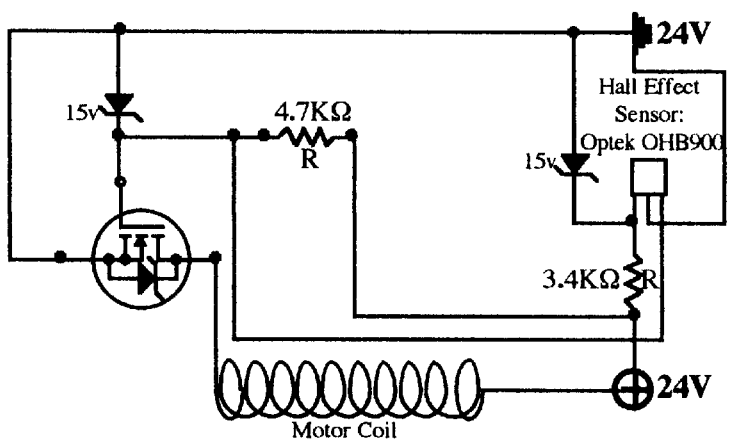
FIG. 55 illustrates a timing and sensing circuit such as used with the direct current motor of FIG. 46.

In FIG. 46, motor 283 is illustrated with four (4) stator assemblies 273 spaced equal distances along the axis so as to allow the rotors 276, which are affixed to shaft 277, to rotate freely between the assemblies within the motor housing 272. End plates 280 hold non-friction bearings 278 into which shaft 277 is fitted so as to allow precise, positioned rotation of rotors 276. Motor housing and coil retainer 272 has stator coil 279 wrapped around it as illustrated in FIG. 46. Infrared or Hall Effect sensor 282 is positioned so that timing disk 281, which is secured to shaft 277, will fit properly into place to give the desired triggering to the timing circuit. A circuit such as is depicted in FIG. 55 is used with sensor 282 and timing disk 281, to control the application of DC current to stator coil 279.

The rotor shunts 275 are biased by their design to interact with the stator magnet flux so as to cause in-line shunting of the magnets 271 in the stator assemblies and to thus sit in the center of the magnets faces as to rotation position. When the power switch to the motor is placed in the "ON" position, sensor 282 and timing window 281 are so positioned that they cause the circuit to apply power to the stator coil 279 when the laminated rotor shunts 275 are just positioned over the center of the faces of magnets 271. The current which is applied to stator coil 279 is out-of-phase with magnets 271. Therefore, magnets 271 resist the applied flux from the stator coil and thus control the flux so that it flows through stator laminated shunts 270. The result is that stator laminated shunts 270 become magnetized in-phase with the flux from stator coil 279 and the rotor laminated shunts also become magnetized in-phase with the flux from stator coil 279. The flux from magnets 271, shunts tightly around through stator laminated shunts 270 into adjacent shunting. This flux configuration results in a very strong torque of the rotor from the previous position of having the laminated rotor shunts 275 positioned in alignment with stator magnets 271, to having the laminated rotor shunts 275 move into alignment with the stator laminated shunts. At this point, the timing disk 281 and sensor 282 trigger the circuit to the "OFF" position and the current to coil 279 is stopped. This causes the flux from stator magnets 271 to begin returning to in-line shunting between the stator magnet assemblies and thus to pull the rotor laminated shunts 275 ahead to the next position where they are in alignment with the face of the stator magnets. This is repeated ad infinitum and the motor runs on pulsed DC with no reversing current ever applied to the stator coil.

This true DC version of the flux diode design can also be reversed so the magnets and laminated shunt assemblies become the rotors and the rotors become the stator assemblies.

Standard AC Version of the Flux Diode Motor

In FIG. 47, the necessary alterations to make the flux diode motor compatible with standard 120V AC wall current, such as 60 Hz or 50 Hz or 400 Hz, etc., is shown. By changing the ratio of size between the magnet poles 173 and the laminated rotor shunts 171, of rotor 170, on shaft 172, it is possible to bias the flux diode motor rotors to resting at the center of a magnet pole instead of between two magnet poles as in many of the previous configurations.

This change in orientation of the rotor to stator configuration causes the magnetomechanical torque relation between the rotor poles and the stator magnet poles and the stator coil to alter so that the motor synchronizes perfectly with an unmodified AC sine-wave such as comes from normal household wall current. Without this ratio change, the flux diode system does not synchronize well with a common sine-wave as used in common AC house current. This change in ratio is accomplished by the laminated rotor poles 171 being reduced in size in relation to the magnet poles 173 until they tend to set at the center of a magnet pole. The general size relationship can be appreciated by the size ratio of magnet poles 173 and circles 177, which represent the size of rotor poles 171 in FIG. 47. This same effect, causing the rotor shunts to rest at the center of the magnet faces, can also be accomplished as it is in the high density versions of the flux diode motor as illustrated in FIGS. 38–46, where the rotor shunts are laminated perpendicular to rotation, thus along the radii and not made wider than the magnet poles. However, this configuration works best with many multiple poles and is unsuited for 60 Hz or 50 Hz operation unless a very low RPM motor is desired. However, it does work well with military frequencies such as 400 Hz.

Once this ratio is established, the motor is now mechanically suited to torque synchronously with an unmodified sine-wave of almost any frequency. Any number of starting systems can be used to bring the motor up to synchronous speed. A TRIAC, triggered by two Hall-Effects and a small capacitor, work well as a starting system on the flux diode motor when connected to AC wall current. Each Hall-Effect triggers one-half of the AC sine-wave, one the positive part and one the negative part. As a result, when the motor is at rest on one of the magnet poles, the same Hall-Effect remains triggered, and thus the same half of the sine-wave keeps repeating until the rotor torques to the other set of magnet poles, where the other Hall-Effect is triggered repeatedly until the rotor moves ahead to the next set of magnet poles. The capacitor is used to double the voltage so the start up will happen more quickly. By use of this method, the flux diode motor comes up to synchronous speed in 1 to 2 seconds with no load or light load.

Flux Lacing Version of the Flux Diode System

Figure 48:
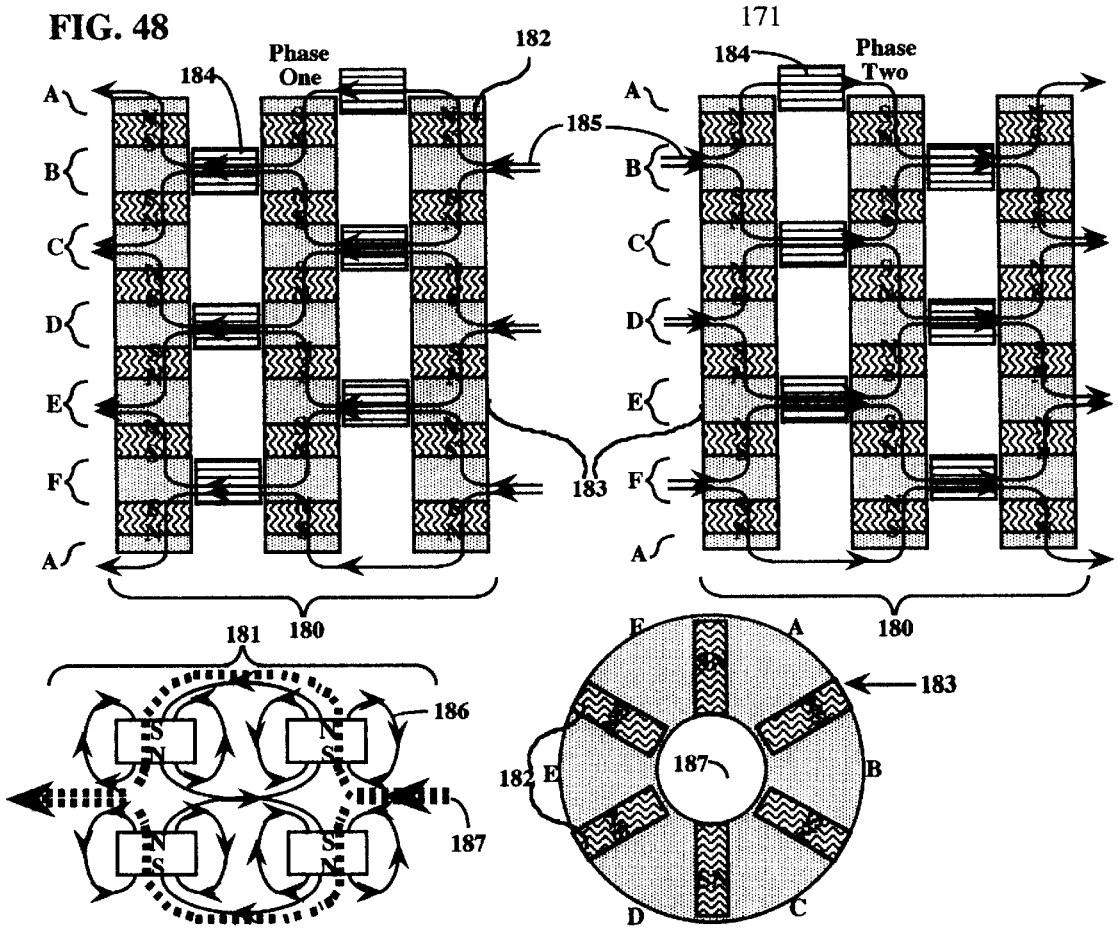
FIG. 48 is a four-part figure describing another embodiment of the flux diode motor of the invention.

In FIG. 48, a slight variation of the flux diode configuration is illustrated which has some advantages which are unique to it when using a flux diode system. At the bottom of FIG. 48, magnet assembly 183 is illustrated which has the magnets 182 spaced equally around center opening 187. The magnets are oriented so as to have their magnetic polarity aligned side to side in parallel with the circumference of stator assembly 186. The magnets 182 are also arranged so that each magnet face of any one magnet is facing a like magnetic pole of the adjacent magnet. Thus, each magnet around the circumference of the stator assembly is out-of-phase with every other magnet which is adjacent to it.

The result is that any stator coil flux moving along the axis from one end to the other of a motor made of these stator assemblies 180, (which it is assumed are wrapped with a stator coil as in all the other flux diode illustration even though not shown in FIG. 48) can only move halfway through the space between any two magnets on the same magnet assembly 183 until the flux configuration of the magnets 182 forces the flux to turn and pass through the magnets as illustrated in Phase #1 and Phase #2 of FIG. 48. The stator coil flux can only enter a space if two South poles are facing each other, as two North poles facing each other will not allow stator coil flux to enter the space previous to the magnet assembly 183, in relation to the direction of stator coil flux travel, but only will allow the stator coil flux to exit the space post the assembly as related to the direction of travel of the stator coil flux.

This is illustrated at 181 where the permanent magnet flux 186 is depicted with thin solid lines and the stator coil flux is depicted with bold dashed lines 187. From 181, it can be clearly appreciated how the stator coil flux is controlled and directed by the permanent magnets so that it can only travel through the spaces between the magnets of a magnetic assembly by turning and passing through a magnet and only through the spaces between the assemblies themselves which are in-phase with the stator coil flux, which is every other space.

Thus, in Phase #1, as the stator coil flux travels from right to left, it can only make its way through the permanent magnet assemblies 183 of the stator assembly 180, by first entering at spaces B, D and F, which have south poles facing each other on both sides of the spaces as illustrated. Halfway through the space of the first permanent magnet assembly, the stator coil flux turns and travels through the magnets 182, from South to North, then continues axially in spaces A, C and E until it is halfway through the center permanent magnetic assembly, where it turns through the magnets and passes through them from their South face to their North face where the stator coil flux is once again in spaces B, D and F. As the stator coil flux moves halfway into the left permanent magnet assembly of the stator assembly, it once again turns and forced by both repulsion and attraction through the magnets on either side of the spaces B, D and F. The stator coil flux then exits the permanent magnetic stator assembly through spaces A, C and E.

In Phase #2, the stator coil flux reverses and the whole sequence is reversed resulting in the stator coil flux entering and passing through the opposite magnet assembly and stator assembly spaces. This results in rotor laminated shunts 184 of the two rotors, which are positioned on the shaft (not shown) from each other so that one rotor's shunts set in spaces A, C and E and the other rotor's shunts set in spaces B, D and F, being torqued from one set of spaces to the other as the phases change one from the other.

Circumferential Flux Diode Motor

Figure 49:
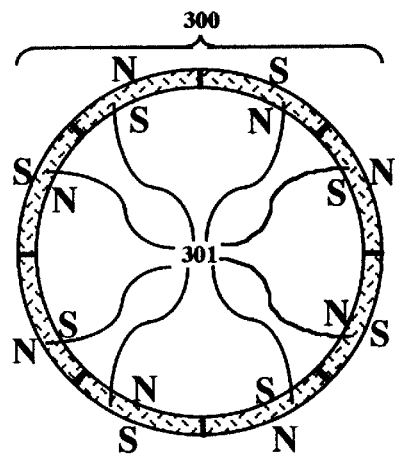
FIGS. 49, 50, 51, 52 and 53 illustrate another embodiment of the flux diode motor of the invention which uses the flux diode effect around the circumference.
Figure 50:
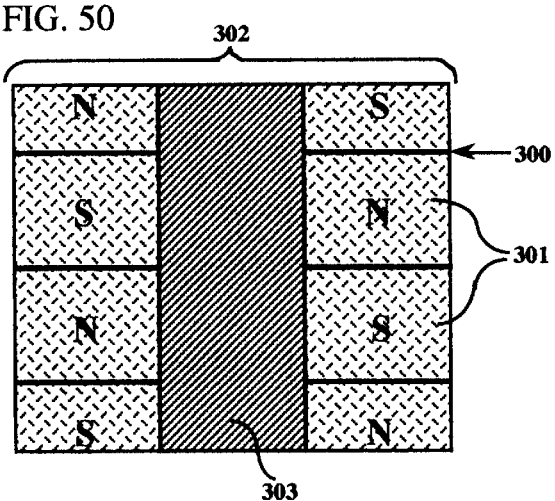
Figure 51:
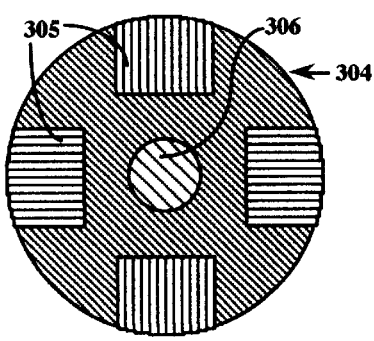
Figure 52:
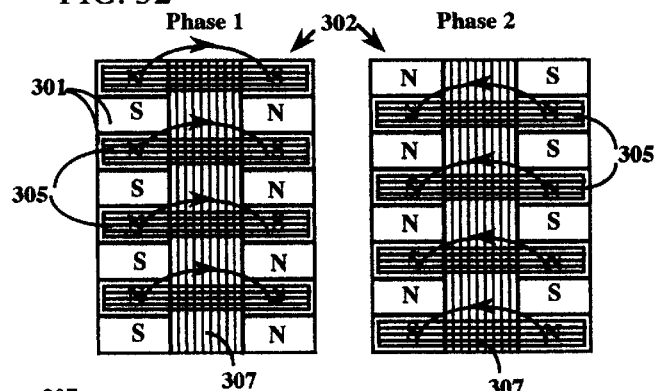
Figure 53:
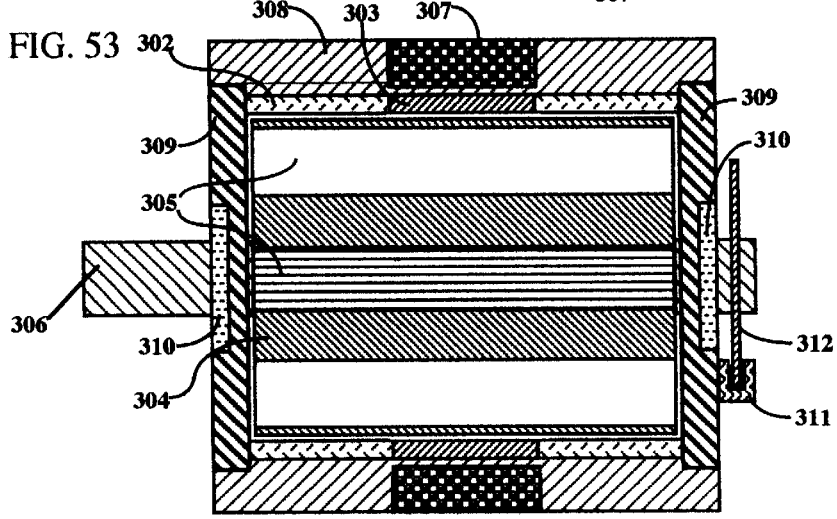

In FIGS. 49–53, another form of the flux diode system is illustrated which uses the flux diode effect around the circumference. In FIG 49, eight (8) 45° are magnets 301, magnetized with a radial orientation, are illustrated composing magnet assembly 300 as seen from the end. Half of the magnets have a North field on their inside face and a South field on their outside face, and the other half have a South field on their inside face and a North field on their outside face. They are then alternated around the circumference of the magnet assembly so that every magnet is of an opposite polarity to the magnet assembly so that every magnet is of an opposite polarity to the magnet adjacent to it. In FIG. 50, the permanent magnet part of the stator assembly 302, for the circumferential flux diode motor, is shown with two permanent magnet assemblies 300 on either end and a no-magnetic spacer 303, such as plastic, fitted between them as seen from a side view. As can seen in FIG. 53, stator magnet assembly 302 is fitted into motor housing 308 which has a slot cut in its center which is over spacer 303, and serves as a coil retainer for stator coil 307 which is wrapped around the circumference of the motor housing. Motor end plates 309 hold non-friction bearings 310 into which shaft 306 is affixed so as to rotate freely. On shaft 306, rotor 304 can be seen illustrated from a side view. Rotor 304 has laminated shunts 305 permanently fixed within it, as can be seen in FIG. 53 as a side view and FIG. 51 as an end view. In FIG. 51, the orientation of the four (4) laminated rotor shunts can be observed and the direction of their lamination.

As can be seen in FIG. 50, permanent magnet assemblies 300, which along with the spacer make up the permanent magnet part of the stator assembly 302, are rotated one set of magnets from each other so that a permanent magnet pole on one side of the spacer is in alignment with an oppositely oriented permanent magnet pole on the other side of the spacer. By looking at FIG. 52, which is a linear view of the inside of permanent magnet stator assembly 302, along with the position of the stator coil 307, which is on the outside of the assembly, indicated, and with the positions of the laminated rotor shunts indicated, it can be observed how these oppositely oriented magnet poles 301, on either side of the spacer and coil 303 and 307, respectively, use the rotor shunts to series their permanent magnet field. This results in the rotor shunts 305 always setting at the center of a set of magnet poles from either magnet ring assembly.

As is depicted in FIG. 52 in Phase #1, when the current is applied to stator coil 307 in one direction, the flux from the stator coil 307 is channeled away from the out-of-phase poles by the permanent magnetic forces and through the in-phase magnet poles by the same said forces. The result is a concentration of the flux from stator coil 307 in the in-phase magnet poles and a shunting down of the out-of-phase magnet pole flux through the in-phase magnet poles. This results in the rotor shunts 305 being torqued into alignment with the in-phase magnet poles.

When the current is reversed in stator coil 307 as depicted in Phase #2 of FIG. 52, the opposite set of permanent magnet poles, which were formerly the out-of-phase poles, are now the in-phase magnet poles and the former set of in-phase poles are now the out-of-phase poles as regards the flux coming from the stator coil 307. The result is the concentration of the flux from stator coil 307 in the opposite set of poles and the shunting down of the flux from the out-of-phase magnet poles through the in-phase magnet poles. This causes the rotor shunts 305 to torque into alignment with the in-phase magnet poles, which is the opposite set from Phase #1. The phases are repeated, ad infinitum.

From the above explanation, it will be appreciated that the motor of the invention is very efficient in that its heat characteristics are extremely low. Under full load, with no fan or heat sink and the motor fully sealed and unventilated, operating prototypes seldom rise more than a few degrees over room temperature, and the efficiency of a motor in accord with the invention approaches 100%.

It is appreciated that various modifications to the inventive concepts may be apparent to those skilled in the art without departing from the spirit and scope of the invention.

What is claimed is:

1. The method of operating an electric motor having a rotatable rotor having ferrite poles located within a stator core made of alternately oriented permanent magnet poles or, a stator core properly incorporating alternately oriented permanent magnet poles wherein the stator core includes a coil and a positive current phase and magnetomechanical flux circuit forces between the rotor and stator in the rotor interaction area rotate the rotor in a first direction about an axis comprising inducing a spinning magnetic field in the rotor interaction area of the stator core to act on the rotatable rotor so that the permanent magnets sort the electromagnetic flux from the stator core's positive-current phase so that the electromagnetically created flux in the stator is induced to set up flux circuits through every other magnet-pole of the stator and is inhibited in setting flux circuits in the remaining magnet-poles of the stator, and upon the stator coil reversing to the negative current phase, the magnet-poles induce the oppositely oriented stator coil flux to set up flux circuits in the poles they previously inhibited in the positive phase and inhibits the stator coil flux from setting up flux circuits in the magnet-poles in which they induced flux circuits in the positive phase.

2. The method of operating an electric motor as in claim 1, wherein due to the proper magnetomechanical orientation of the stator magnets with the stator coil causes the stator coil-induced-flux and permanent-magnet-flux of every other pole, which is in-phase with the induced coil-flux of that electrical phase, to series together to set up flux circuits in the rotor interaction area of the stator from those poles, and the permanent magnet flux from the other oppositely oriented poles, which are out of phase with the induced flux from that same electrical phase, to collapse and shunt back through the adjustment in-phase permanent magnet poles due to opposition of the applied electromagnetic flux from the stator coil and thus not setting up flux circuits in the rotor interaction area of the stator assembly from those poles, and thus causing the alternating establishment of torque inducing flux circuits on the faces of the two different sets of stator magnet-poles, as the stator coil current alternates, which will cause torque on a properly designed rotor with ferrite poles.

3. The method of operating an electric motor as in claim 2, wherein a magnetic relationship is established in the stator design between the stator permanent magnets and the stator coil where it is possible for the electromagnetic flux from the stator coil to interact and series with the permanent magnet flux of all the stator poles through the course of a complete electrical cycle but does so by establishing magnetic series only with one-half of the permanent magnetic poles, and this being every other pole, in the course of a half cycle which establishes flux circuits in the rotor interaction area of the stator on those magnetic poles, and then re-establishing magnetic series with the remaining poles in the opposite half-cycle which establishes flux circuits in the rotor interaction area of the stator on those magnetic poles, and thus the two half-phase resulting in establishing alternating concentrations of flux on the faces of the two different sets of poles of the stator for the purpose of interacting with a properly designed rotor with ferrite poles.

4. A method of operating an electric motor as in claim 3, wherein the permanent magnets used and the coil used, do not have mechanical movement in relation to each other but do interact magnetically to create alternating concentrations of flux on alternating sets of poles for the purpose of inducing torque on a rotor properly designed with ferrite poles to interact with the alternating flux concentrations.

* * * * *

UNITED STATES PATENT AND TRADEMARK OFFICE
CERTIFICATE OF CORRECTION

PATENT NO. : 6,611,078 B1
DATED : August 26, 2003
INVENTOR(S) : Durham et al.

It is certified that error appears in the above-identified patent and that said Letters Patent is hereby corrected as shown below:

<u>Title page,</u>
Item [75], Inventors, please delete "Wchita" and insert -- Wichita --;

<u>Column 10,</u>
Line 24, after "However" please insert -- , --;
Lines 33 and 43, please delete "nonmagnetic" and insert -- non-magnetic --;

<u>Column 28,</u>
Line 27, please delete "are" and insert -- arc --;
Line 40, please delete "no-magnetic" and insert -- non-magnetic --;

<u>Column 30,</u>
Line 16, please delete "adjustment" and insert -- adjacent --.

Signed and Sealed this

Sixteenth Day of December, 2003

JAMES E. ROGAN
*Director of the United States Patent and Trademark Office*